(12) United States Patent
Tanaka et al.

(10) Patent No.: US 12,425,720 B2
(45) Date of Patent: Sep. 23, 2025

(54) IMAGING APPARATUS AND CONTROL METHOD FOR IMAGING APPARATUS

(71) Applicant: SONY GROUP CORPORATION, Tokyo (JP)

(72) Inventors: Yasuhito Tanaka, Tokyo (JP); Tetsuhiro Maeda, Tokyo (JP); Junji Akira, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 2 days.

(21) Appl. No.: 18/261,833

(22) PCT Filed: Jan. 7, 2022

(86) PCT No.: PCT/JP2022/000393
§ 371 (c)(1),
(2) Date: Jul. 17, 2023

(87) PCT Pub. No.: WO2022/158318
PCT Pub. Date: Jul. 28, 2022

(65) Prior Publication Data
US 2024/0080544 A1    Mar. 7, 2024

(30) Foreign Application Priority Data
Jan. 25, 2021    (JP) .................... 2021-009444

(51) Int. Cl.
*H04N 23/60*     (2023.01)
*H04N 23/667*    (2023.01)
*H04N 23/69*     (2023.01)

(52) U.S. Cl.
CPC .......... *H04N 23/64* (2023.01); *H04N 23/667* (2023.01); *H04N 23/69* (2023.01)

(58) Field of Classification Search
CPC ...... H04N 23/64; H04N 23/667; H04N 23/69; H04N 23/80; H04N 23/62; G03B 5/00; G03B 7/00; G03B 17/14; G03B 17/18
See application file for complete search history.

(56) References Cited

U.S. PATENT DOCUMENTS

2006/0126082 A1*  6/2006  Choi ................... H04N 1/2112
                                                      358/1.2
2008/0158393 A1*  7/2008  Taoka .................. H04N 23/69
                                                     348/240.1
(Continued)

FOREIGN PATENT DOCUMENTS

JP    2008-167293 A    7/2008
JP    2013-106167 A    5/2013
(Continued)

OTHER PUBLICATIONS

International Search Report and Written Opinion of PCT Application No. PCT/JP2022/000393, issued on Mar. 15, 2022, 10 pages of ISRWO.

*Primary Examiner* — Padma Haliyur
(74) *Attorney, Agent, or Firm* — CHIP LAW GROUP

(57) ABSTRACT

Provided are an imaging apparatus and a control method for an imaging apparatus that can obtain image data with the same image size even with different angle of view sizes. The imaging apparatus includes an image size setting unit that sets an image size selected from multiple settable image sizes, an angle of view size setting unit that sets an angle of view size selected from multiple settable angle of view sizes that include a first angle of view size and a second angle of view size, and a control unit that performs pixel count control on the set image size set by the image size setting unit, to achieve the same or almost the same number of pixels regardless of a difference in the set angle of view size.

17 Claims, 21 Drawing Sheets

(56) References Cited

U.S. PATENT DOCUMENTS

| | | | | |
|---|---|---|---|---|
| 2013/0162868 A1* | 6/2013 | Watanabe | .............. | H04N 23/69 |
| | | | | 348/240.3 |
| 2016/0100145 A1* | 4/2016 | Gunji | ................... | H04N 23/635 |
| | | | | 348/222.1 |
| 2018/0048825 A1* | 2/2018 | Wang | ..................... | H04N 23/45 |
| 2020/0007766 A1* | 1/2020 | Haruna | ................ | H04N 23/815 |
| 2020/0213497 A1* | 7/2020 | Kubo | ................... | H04N 23/689 |
| 2021/0368104 A1* | 11/2021 | Bian | ................... | H04N 23/698 |

FOREIGN PATENT DOCUMENTS

| | | | |
|---|---|---|---|
| JP | 2016-127451 A | 7/2016 |
| JP | 2017-116866 A | 6/2017 |
| JP | 2020-005106 A | 1/2020 |

\* cited by examiner

FIG. 2
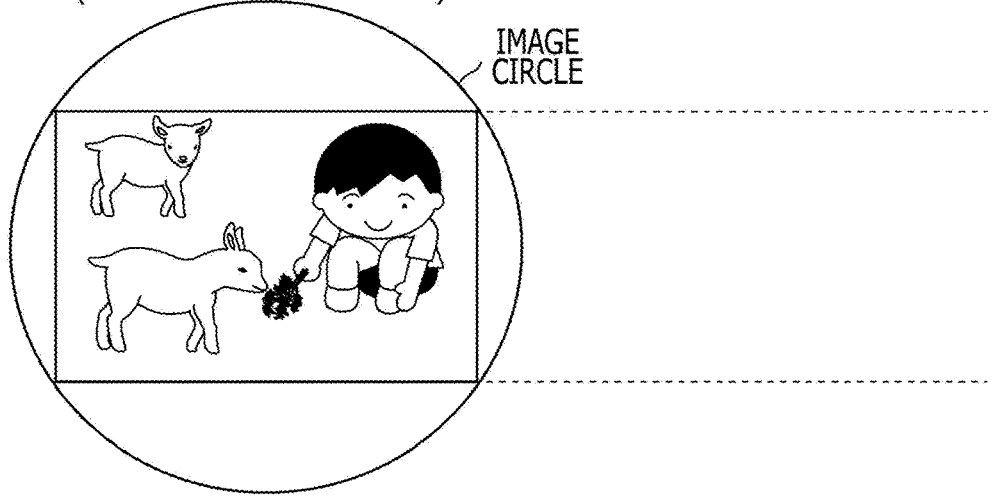
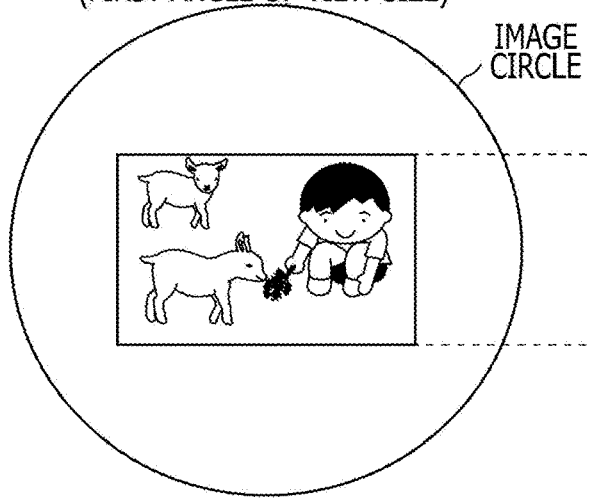 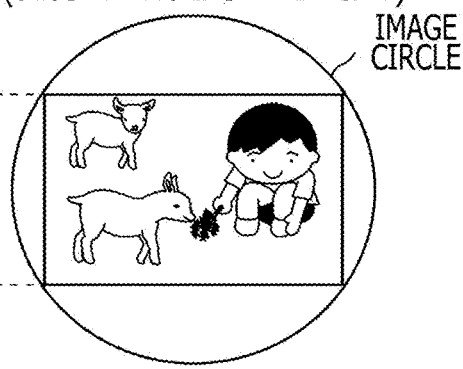
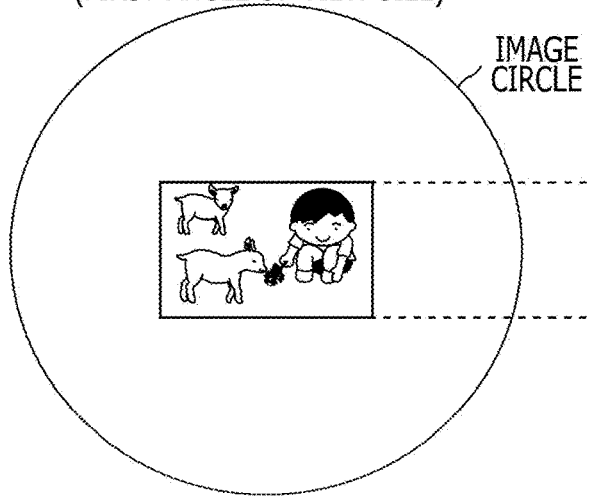 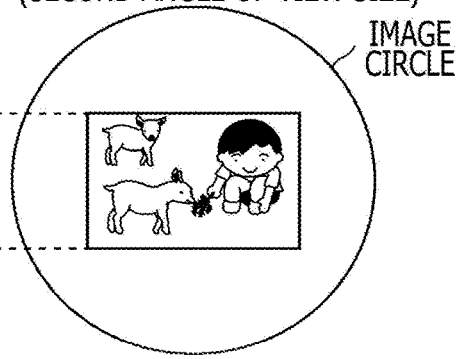

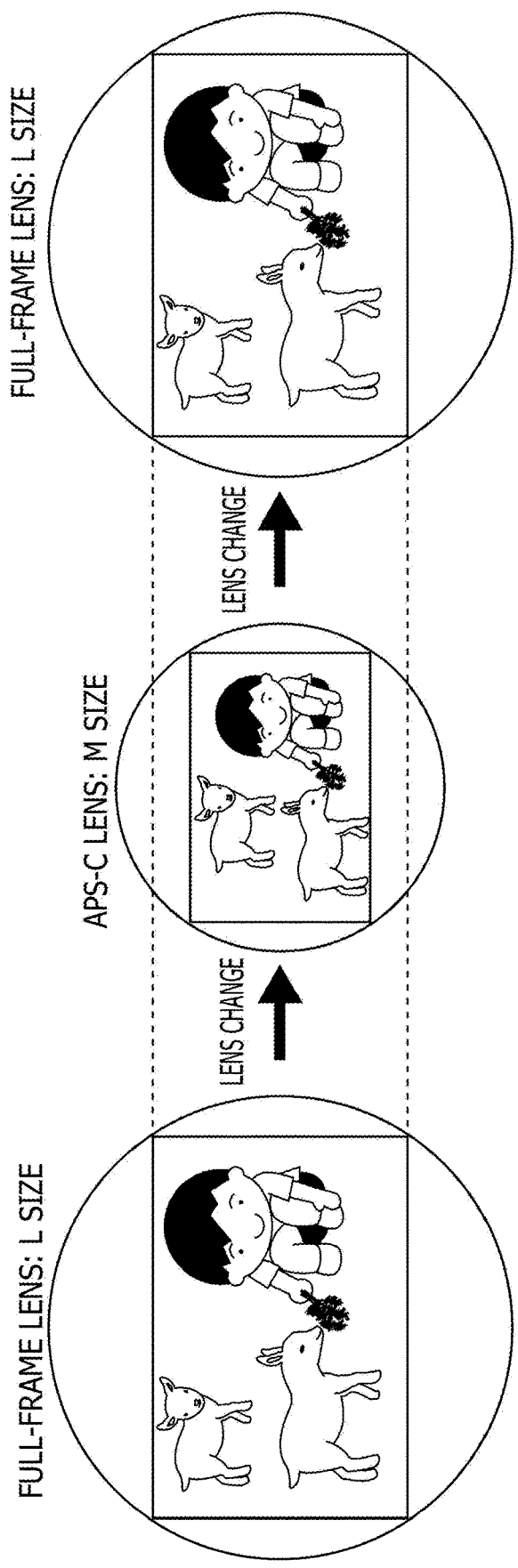

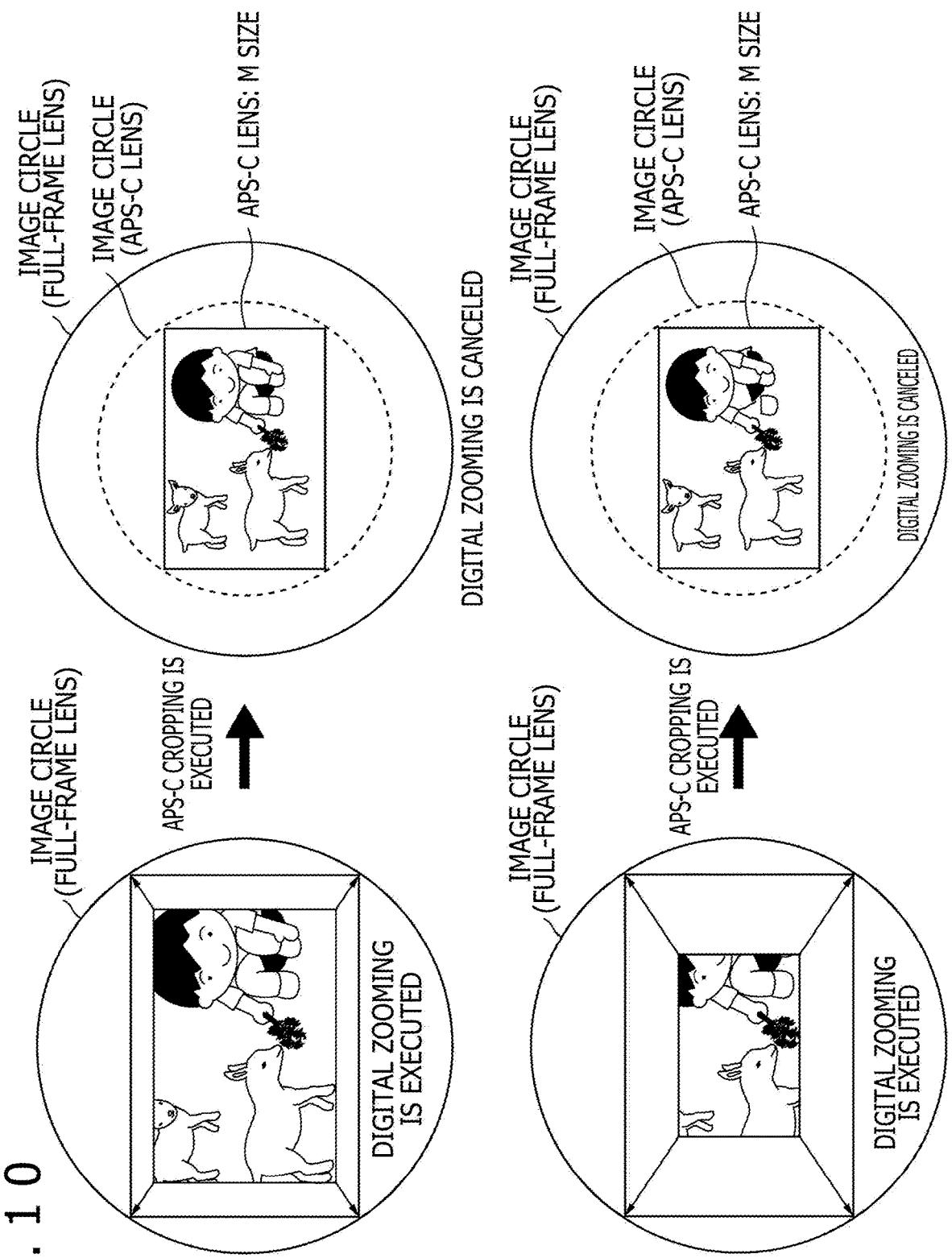

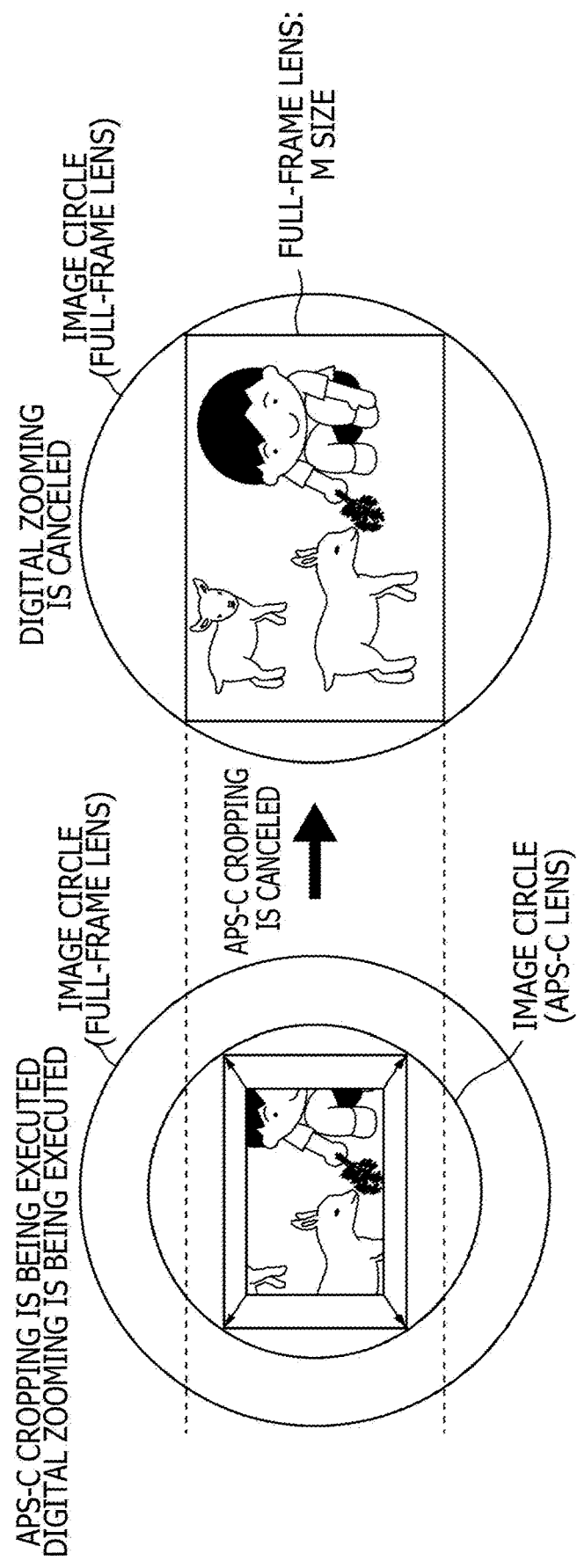

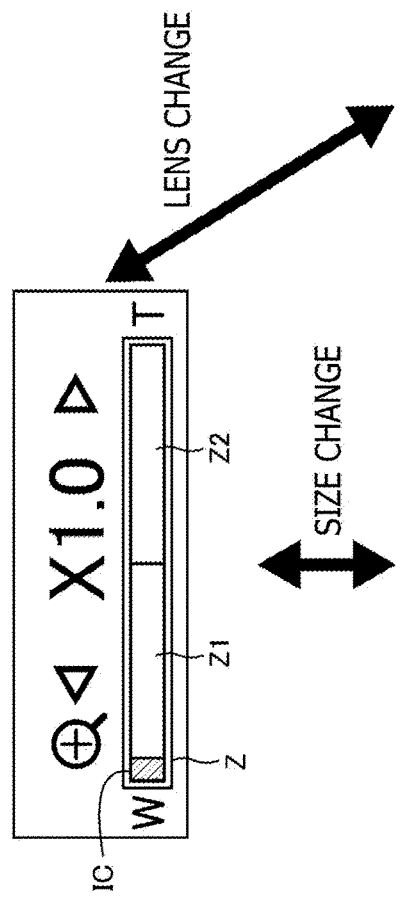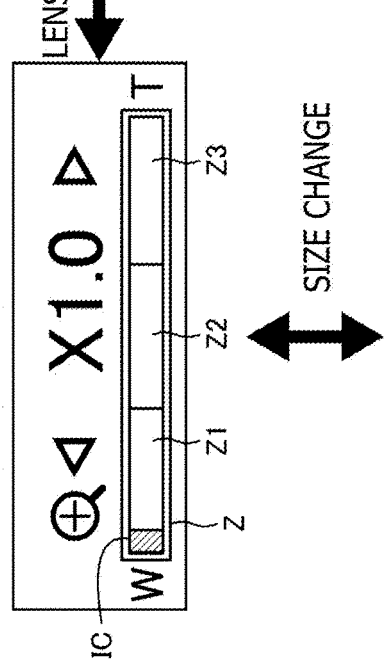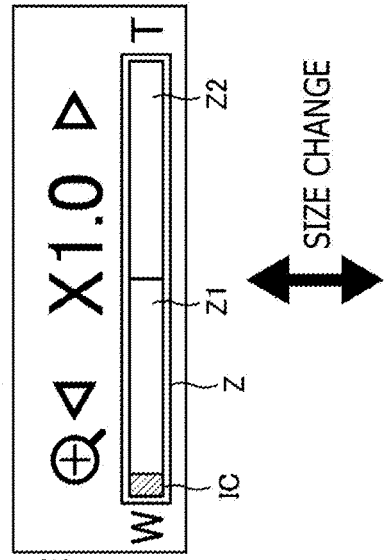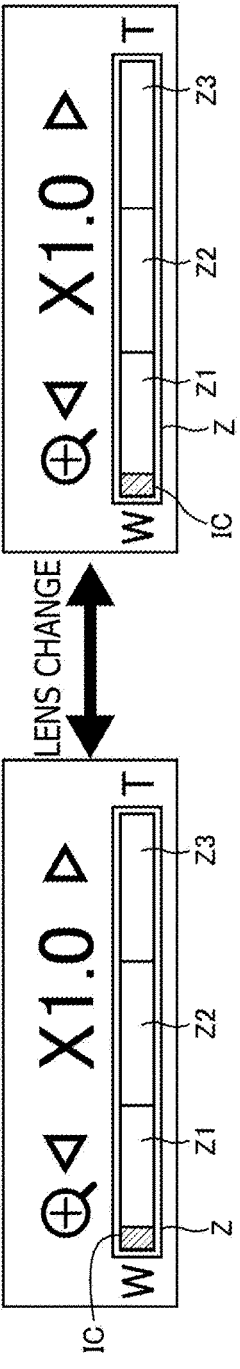
FIG. 13

FIG.15

FIRST RECORDING FORMAT EXAMPLE

|   | FULL-FRAME | APS-C |
|---|---|---|
| L | Bayer RAW |  |
| M | YUV420 | YUV420 |
| S | YUV422 | YUV422 |

SECOND RECORDING FORMAT EXAMPLE

|   | FULL-FRAME | APS-C |
|---|---|---|
| L | Bayer RAW |  |
| M | YUV420 | Bayer RAW |
| S | YUV422 | YUV420 |

THIRD RECORDING FORMAT EXAMPLE

|   | FULL-FRAME | APS-C |
|---|---|---|
| L | Bayer RAW |  |
| M | YUV422 | Bayer RAW |
| S | YUV422 | YUV422 |

FOURTH RECORDING FORMAT EXAMPLE

|   | FULL-FRAME | APS-C |
|---|---|---|
| L | Bayer RAW |  |
| M | YUV420 | Bayer RAW |
| S | YUV420 | YUV420 |

FIFTH RECORDING FORMAT EXAMPLE

|   | FULL-FRAME | APS-C |
|---|---|---|
| L | YUV422 |  |
| M | YUV422 | YUV422 |
| S | YUV422 | YUV422 |

SIXTH RECORDING FORMAT EXAMPLE

|   | FULL-FRAME | APS-C |
|---|---|---|
| L | YUV420 |  |
| M | YUV420 | YUV420 |
| S | YUV420 | YUV420 |

IMAGING APPARATUS AND CONTROL METHOD FOR IMAGING APPARATUS

CROSS REFERENCE TO RELATED APPLICATIONS

This application is a U.S. National Phase of International Patent Application No. PCT/JP2022/000393 filed on Jan. 7, 2022, which claims priority benefit of Japanese Patent Application No. JP 2021-009444 filed in the Japan Patent Office on Jan. 25, 2021. Each of the above-referenced applications is hereby incorporated herein by reference in its entirety.

TECHNICAL FIELD

The present technology relates to an imaging apparatus, a control method for an imaging apparatus, and a control program.

BACKGROUND ART

As lenses that can be mounted on imaging apparatuses, there are full-frame lenses and APS-C lenses. Since the image circle differs between full-frame lenses and APS-C lenses, an image captured and saved with a full-frame lens and an image captured and saved with an APS-C lens have different sizes. Thus, when shooting is performed with a full-frame lens and then shooting is performed with an APS-C lens after the lens is changed to the APS-C lens, the images saved before and after the lens change have different sizes.

Therefore, there are cameras that can set, in addition to the general image sizes L, M, and S, an image size S2 that is the minimum image size and independent of the image circle and the number of pixels of the image sensor (PTL 1).

CITATION LIST

Patent Literature

[PTL 1]
Japanese Patent Laid-open No. 2020-005106

SUMMARY

Technical Problems

The image size S2 is usually used for web applications and smaller than the image sizes L, M, and S. When an APS-C lens is mounted, the sizes of the image sizes L, M, and S are smaller than those for full-frame lenses. In such a case, the image sizes M and S are smaller than the image size S2 in some cases, resulting in a situation where the user cannot intuitively recognize the size, which is a problem.

Moreover, there is another problem in that, when a lens with shooting settings is changed (from a full-frame lens to an APS-C lens), the images saved before and after the lens change have different sizes.

The present technology has been made in view of these points and has an object to provide an imaging apparatus, a control method for the imaging apparatus, and a control program that can obtain image data with the same image size even with different angle of view sizes.

Solution to Problems

In order to solve the problems described above, according to a first technology, there is provided an imaging apparatus including an image size setting unit configured to set a set image size selected from multiple settable image sizes, an angle of view size setting unit configured to set a set angle of view size selected from multiple settable angle of view sizes that include a first angle of view size and a second angle of view size, and a control unit configured to perform pixel count control on the set image size set by the image size setting unit, to achieve the same or almost the same number of pixels regardless of a difference in the set angle of view size.

Further, according to a second technology, there is provided a control method for an imaging apparatus, including setting a set image size selected from multiple settable image sizes, setting a set angle of view size selected from multiple settable angle of view sizes that include a first angle of view size and a second angle of view size, and performing pixel count control on the set image size set, to achieve the same or almost the same number of pixels regardless of a difference in the set angle of view size.

Further, according to a third technology, there is provided a control program for causing a computer to execute a control method for an imaging apparatus, the control method including setting a set image size selected from multiple settable image sizes, setting a set angle of view size selected from multiple settable angle of view sizes that include a first angle of view size and a second angle of view size, and performing pixel count control on the set image size set, to achieve the same or almost the same number of pixels regardless of a difference in the set angle of view size.

BRIEF DESCRIPTION OF DRAWINGS

FIG. 2 is an explanatory diagram of image sizes.
FIG. 9 is an explanatory diagram of lens changes and the image sizes.
FIG. 10 is an explanatory diagram of zoom cancellation.
FIG. 11 is an explanatory diagram of zoom cancellation.
FIG. 13 is a diagram illustrating a zoom magnification setting UI.
FIG. 15 is an explanatory diagram of the recording formats of image data.

DESCRIPTION OF EMBODIMENTS

Now, embodiments of the present technology are described with reference to the drawings. Note that the description is given in the following order.

<1. First Embodiment>
[1-1. Configuration of Imaging Apparatus 100]
[1-2. Image Size]
[1-3. Processing in Imaging Apparatus 100]
[1-4. User Interface]
[1-5. Image Size and Recording of Image Data]
[1-6. Recording Format of Image Data]
<2. Second Embodiment>
[2-1. Configuration of Imaging Apparatus 100]
[2-2. Processing in Imaging Apparatus 100]
<3. Modified Example>

1. First Embodiment

[1-1. Configuration of Imaging Apparatus 100]

Figure 1:
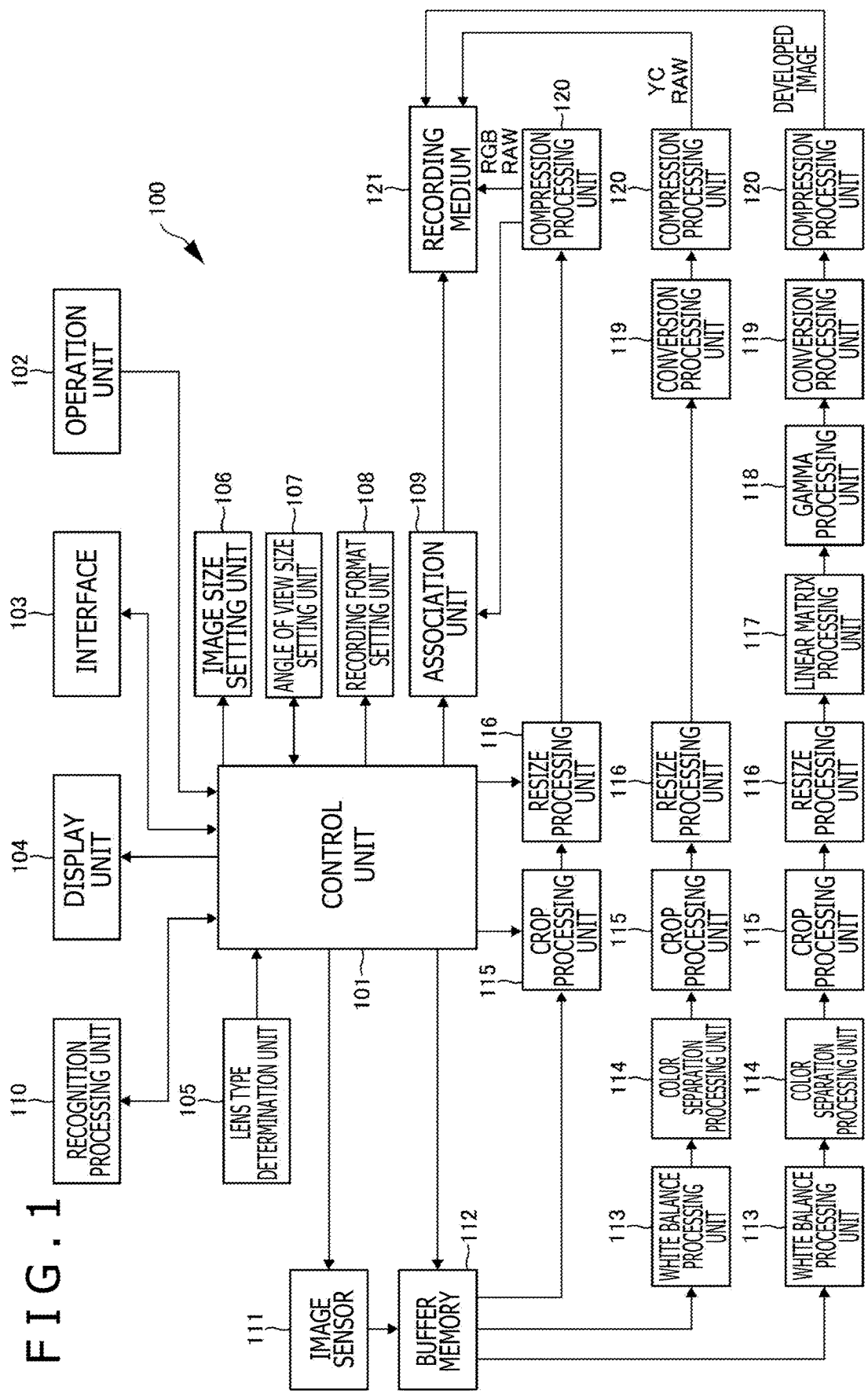
FIG. 1 is a block diagram illustrating a configuration of an imaging apparatus 100.

With reference to FIG. 1, a configuration of an imaging apparatus 100 is described. The imaging apparatus 100 incudes a control unit 101, an operation unit 102, an interface 103, a display unit 104, a lens type determination unit 105, an image size setting unit 106, an angle of view size setting unit 107, a recording format setting unit 108, an association unit 109, a recognition processing unit 110, an image sensor 111, a buffer memory 112, white balance processing units 113, color separation processing units 114, crop processing units 115, resize processing units 116, a linear matrix processing unit 117, a gamma processing unit 118, conversion processing units 119, compression processing unit 120s, and a recording medium 121.

The control unit 101 includes a CPU (Central Processing Unit), a RAM (Random Access Memory), a ROM (Read Only Memory), and the like. The CPU executes various types of processing in accordance with programs stored in the ROM, to issue commands and thereby control the entire imaging apparatus 100. Further, the control unit 101 also performs the control and processing of the respective units, such as readout control in the image sensor 111, saving control of image data in the buffer memory 112, calculation of the number of pieces of recordable image data, and switching control of the recording formats of image data.

The operation unit 102 allows a user to give various instructions or the like to the imaging apparatus 100. When input operations are performed by the user on the operation unit 102, the operation information is supplied to the control unit 101. Then, the control unit 101 performs various types of control corresponding to the operation information. Examples of the operation unit 102 include shutter buttons for shutter input, physical buttons for various operations, touch panels, and a touch screen integrated with a display that serves as the display unit 104.

The interface 103 is an interface between the imaging apparatus 100 and other apparatuses, networks, and the like. The interface 103 may include wired or wireless communication interfaces. Further, more specifically, the wired or wireless communication interfaces may include cellular communication such as 3TTE, 4G, 5G, Wi-Fi, Bluetooth (registered trademark), NFC (Near Field Communication), Ethernet (registered trademark), HDMI (registered trademark) (High-Definition Multimedia Interface), a USB (Universal Serial Bus), and the like.

The display unit 104 is an EVF (Electronic View Finder), a display, or the like, and displays through images, video data, image data, a UI (User Interface), and the like. Examples of the display unit 104 include LCDs, PDPs, and organic EL panels.

The lens type determination unit 105 determines the type of lens mounted on the imaging apparatus 100. For example, the lens type determination unit 105 acquires lens identification information that a lens has when the terminals provided on the lens are brought into contact with the terminals included in the imaging apparatus 100 at the time of lens mounting, and thereby recognizes the type of lens.

The image size setting unit 106 sets any of multiple settable image sizes as the set image size of image data, in reference to the user's operation input to the operation unit 102, angle of view information indicating the angle of view size set by the angle of view size setting unit 107, the operating mode of the imaging apparatus 100, the recognition result of the recognition processing unit 110, and the like. Note that, in the present technology, it is assumed that the image size of image data is defined by the number of pixels.

The angle of view size setting unit 107 sets the angle of view size of image data in reference to the user's operation input, which indicates, for example, cropping, to the operation unit 102, lens type information supplied from the lens type determination unit 105, and the like. The angle of view is set by the angle of view size and the angle of view position.

In the present embodiment, a first angle of view size is the angle of view size corresponding to the size of an image sensor of the full-frame size, and a second angle of view size is the angle of view size corresponding to the size of an image sensor of the APS-C size. Accordingly, in a case where the lens mounted on the imaging apparatus 100 is a full-frame lens, the angle of view size setting unit 107 sets the first angle of view size, and in a case where the lens mounted on the imaging apparatus 100 is an APS-C lens, the angle of view size setting unit 107 sets the second angle of view size. Further, it is assumed that the angle of view size when APS-C cropping is canceled is the first angle of view size, and the angle of view size when APS-C cropping is executed is the second angle of view size. Hence, the angle of view size setting unit 107 sets the first angle of view size when APS-C cropping is canceled and sets the second angle of view size when APS-C cropping is executed. APS-C cropping is described later.

Note that the control unit 101 controls the angle of view size setting unit 107 to set the angle of view size according to the type of lens mounted on the imaging apparatus 100. Moreover, the control unit 101 controls the angle of view size setting unit 107 to set the angle of view size according to whether the APS-C crop function of the imaging apparatus 100 is executed or canceled.

Further, the control unit 101 performs pixel count control on the image size set by the image size setting unit 106, to achieve the same or almost the same number of pixels regardless of the difference in the angle of view size set by the angle of view size setting unit 107.

The recording format setting unit 108 sets the recording formats of image data in reference to the user's operation input to the operation unit 102. Examples of recording formats include RAW, JPEG (Joint Photographic Experts Group), HEIF (High Efficiency Image File Format), YUV 422, and YUV 420.

The control unit 101 receives operation information from the operation unit 102 and controls the image size setting unit 106, the angle of view size setting unit 107, and the recording format setting unit 108 to make their respective settings in reference to the operation information.

The association unit 109 associates various types of information such as angle of view information and image size information with image data. Note that any of the recording medium 121, the interface 103, and the compression processing unit 12 may function as the association unit 109.

The recognition processing unit 110 recognizes objects or scenes with use of a known object recognition technology or scene recognition technology. Examples of known object recognition technologies and scene recognition technologies include methods using template matching, matching methods based on luminance distribution information regarding objects, methods based on the brightness of objects, methods based on skin color parts, features of human faces, or the like included in images, methods using machine learning, and methods using artificial intelligence. Further, the recognition accuracy may be increased by combining these techniques. Further, the image data may be transmitted to other apparatuses, external servers, clouds, or the like in which the image data undergoes recognition processing, and the imaging apparatus 100 may receive the recognition result.

The image sensor 111 converts incident light from an object obtained through a lens to a charge amount through photoelectric conversion and outputs the charge amount as image data. Examples of the image sensor 111 include a CCD (Charge Coupled Device) and a CMOS (Complementary Metal Oxide Semiconductor).

The image sensor 111 is a 35 mm full-frame image sensor with a size of 36.0 mm×24.0 mm. In the present embodiment, the imaging apparatus 100 is a camera including a 35 mm full-frame sensor. Further, in the present embodiment, the imaging apparatus 100 is an interchangeable lens camera that is compatible with both 35 mm full-frame lenses (hereinafter referred to as a "full-frame lens") and APS-C lenses (hereinafter referred to as an "APS-C lens") designed to be compatible with the image sensor 111 of the APS-C size. The first angle of view size is the angle of view size corresponding to full-frame lenses, and the second angle of view size smaller than the first angle of view size is the angle of view size corresponding to APS-C lenses.

A full-frame lens has set thereto an image circle that optimizes the optical properties (such as light intensity and aberration performance) for the image sensor 111 of the full-frame size. Further, an APS-C lens has set thereto an image circle that optimizes the optical properties for the image sensor 111 of the APS-C size. The image circle of the APS-C lens is smaller than the image circle of the full-frame lens.

It is assumed that, in the full-frame lens mounted state, the angle of view size setting unit 107 sets the set angle of view size to the first angle of view size, and in the APS-C lens mounted state, the angle of view size setting unit 107 sets the set angle of view size to the second angle of view size. The angle of view size is changed by the lens mounted on the imaging apparatus 100 being changed.

The buffer memory 112 includes, for example, a DRAM (Dynamic Random Access Memory) or the like, and temporarily stores image data output from the image sensor 111. The control unit 101 switches which recording format of image data is to be generated, by controlling the buffer memory 112.

Note that, although not illustrated, a processing unit configured to perform image sensor correction or lens correction may be provided at a subsequent stage of the buffer memory 112. Examples of image sensor correction include defect correction, smear correction, and color mixture correction. Examples of lens correction include distortion correction, magnification chromatic aberration correction, and Deconv (PSF inverse filter).

The white balance processing unit 113 applies white balance processing to image data according to desired white balance settings. Note that, since white balance processing differs between YC RAW and JPEG, two white balance processing units 113 are provided, and the subsequent processing units are also provided in plural number. Note that, in a case where image quality is not a priority, white balance processing may not be performed since white balance processing is to ensure the image quality performance of color separation.

The color separation processing unit 114 applies, as color separation processing, for example, demosaic processing, to image data that has undergone white balance processing. Note that the color separation processing unit 114 is not an essential configuration. Note that it is only necessary that white balance and color separation be approximately determined with a tolerance for performance degradation attributable to a spatial phase shift.

The crop processing unit 115 performs crop processing to change the angle of view of image data, according to the angle of view set by the angle of view size setting unit 107.

The resize processing unit 116 applies resize processing to change, by changing the number of pixels of image data according to the number of pixels set through pixel count control by the control unit 101, the image size.

Note that the order of crop processing and resize processing may be reversed. Further, crop processing and resize processing may be performed at any stage before the processing of the compression processing unit 120. Moreover, it is also possible to generate image data without performing crop processing and resize processing.

The linear matrix processing unit 117 applies linear matrix processing to image data.

The gamma processing unit 118 applies gamma correction processing to image data.

The conversion processing unit 119 applies YC conversion processing to convert RGB image data to YC image data including luminance signals and color difference signals. Note that, in a case where white balance processing and color separation are not performed, approximate processing using Bayer 2×2 pixels as a unit, such as substituting (Gr, Gb), R-Gr, and R-Gb for Y, Cr, and Cb, is applied. However, although such approximate processing is typically not included in YC conversion processing, in the present technology, such approximate processing is assumed to be included in YC conversion. The processing in the conversion processing unit 119 may be performed before the processing in the crop processing unit 115 and the resize processing unit 116.

The compression processing unit 120 applies compression processing to image data. The compression processing unit 120 acquires recording format information from the recording format setting unit 108 and performs any of compression, lossless compression, and non-compression on image data according to the set recording format. The details of compression processing are described later in a second embodiment.

The recording medium 121 records image data that has undergone compression processing. The recording medium 121 may be an internal hard disk or the like of the imaging apparatus 100 or an external recording medium, such as a flash memory, connected to the imaging apparatus 100. Note that it is also possible to transfer image data that has been recorded on the recording medium 121 or has not been recorded on the recording medium 121 to an external apparatus via the interface 103 and record the image data on the external apparatus.

Image data that has undergone crop processing, resize processing, and compression processing is recorded as RGB RAW image data. Further, image data that has undergone white balance processing, color separation processing, crop processing, resize processing, conversion processing, and compression processing is recorded as YC RAW image data. Moreover, image data that has undergone white balance processing, color separation processing, crop processing, resize processing, linear matrix processing, gamma processing, conversion processing, and compression processing is recorded as developed images in such recording formats as JPEG and HEIF.

The imaging apparatus 100 is configured as described above. Note that the number of each of the white balance processing units 113, the color separation processing units 114, the crop processing units 115, the resize processing units 116, the conversion processing units 119, and the compression processing units 120, which is a plural number, may be one.

The imaging apparatus 100 is an interchangeable lens camera as described above. Examples of the imaging apparatus 100 may include, in addition to interchangeable lens apparatuses specialized for camera functions such as digital cameras, single-lens reflex cameras, camcorders, business-use cameras, and professional-grade shooting equipment, interchangeable lens smartphones, tablets, wearable devices, and handheld game consoles that have camera functions.

Note that the control unit 101, the image size setting unit 106, and the angle of view size setting unit 107 may be configured by a program, and the imaging apparatus 100 may achieve the functions of those by executing the program. The program may be installed on the imaging apparatus 100 in advance or distributed via download, storage media, or the like to allow the user to install the program on the imaging apparatus 100 by himself/herself.

[1-2. Image Size]

Next, the processing in the imaging apparatus 100 of the first embodiment is described. First, image sizes according to the first embodiment are described with reference to FIGS. 2, 3A, and 3B.

As illustrated in FIG. 2, it is assumed that, in the case of the full-frame lens mounted state where the angle of view size is the first angle of view size, the maximum image size within the image circle is an L size. Further, it is assumed that a size smaller than the L size is an M size, and further, the minimum image size smaller than the M size is an S size. In the following description, for convenience, the respective sizes in the full-frame lens mounted state where the angle of view size is the first angle of view size are sometimes referred to as an "L size for FF (Full Format)," an "M size for FF," and an "S size for FF." Note that the size of the image circle and the angle of view are the same for all the sizes, which include the L size, the M size, and the S size.

In the case of the APS-C lens mounted state where the angle of view size is the second angle of view size, it is assumed that there is no L size, and the maximum size within the image circle is an M size. Further, it is assumed that the minimum size smaller than the M size is an S size. In the following description, for convenience, the respective sizes in the APS-C lens mounted state where the angle of view size is the second angle of view size are sometimes referred to as an "M size for APS-C" and an "S size for APS-C."

Figure 3A:
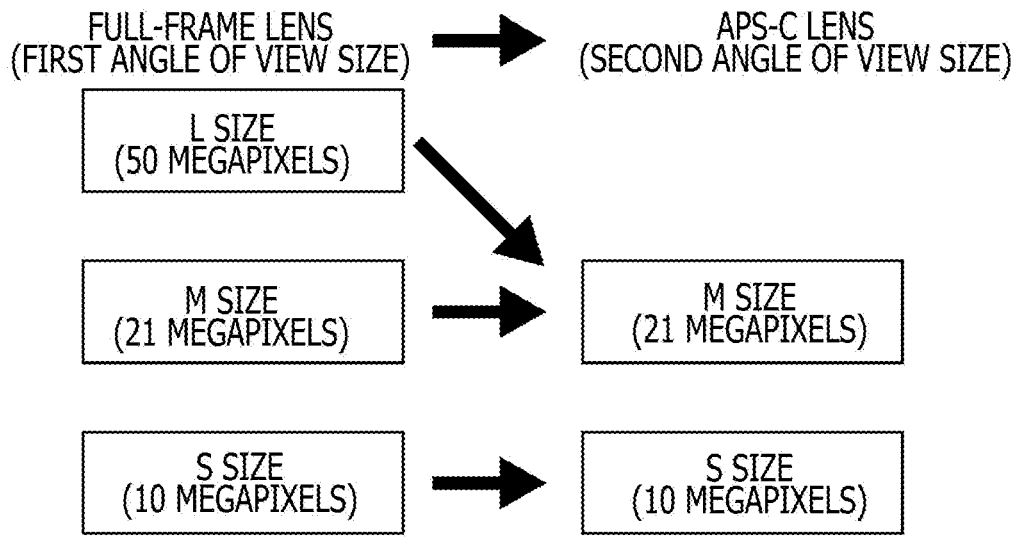
FIGS. 3A and 3B depict explanatory diagrams of the image sizes.
Figure 3B:
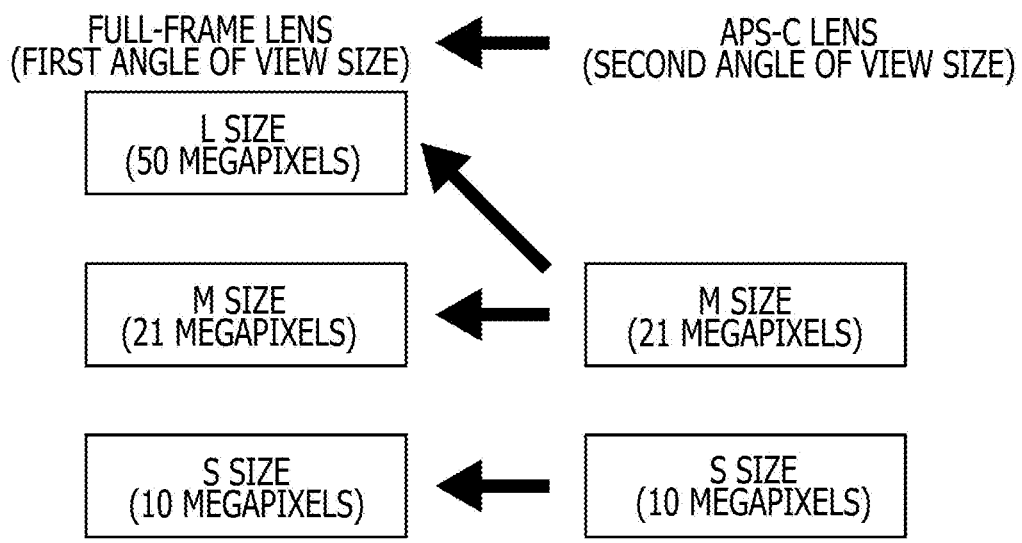

As illustrated in FIGS. 3A and 3B, the number of pixels of each image size is as follows, for example. The L size for FF has 50 megapixels, the M size for FF has 21 megapixels, and the S size for FF has 10 megapixels. Further, the M size for APS-C has 21 megapixels, and the S size for APS-C has 10 megapixels. Note that the number of pixels of each image size is merely an example, and the present technology is not limited to the number of pixels.

In such a manner, in the first embodiment, the control unit 101 performs pixel count control such that the number of pixels of the M size for FF and the number of pixels of the M size for APS-C are the same or almost the same. This allows the M size for FF and the M size for APS-C to have the same image size and have the same or almost the same number of pixels. Further, the control unit 101 performs pixel count control such that the number of pixels of the S size for FF and the number of pixels of the S size for APS-C are the same or almost the same. This allows the S size for FF and the S size for APS-C to have the same image size and have the same or almost the same number of pixels.

Here, "almost the same" refers to a state where image sizes have an allowable range of error. Hence, the M size for FF and the M size for APS-C may have an error of a few pixels, for example, as an allowable range of error. Further, the S size for FF and the S size for APS-C may have an error of a few pixels, for example, as an allowable range of error. Note that, in the following description, the "same number of pixels" refers to the same number of pixels and almost the same number of pixels.

With this, as illustrated in FIGS. 3A, 3B, and 3C, even when the angle of view size setting unit 107 changes the angle of view size when the lens mounted on the imaging apparatus 100 is changed from a full-frame lens to an APS-C lens, the number of pixels of image data obtained by shooting remains the same for the M size and the S size. The same applies to a case where the lens mounted on the imaging apparatus 100 is changed from an APS-C lens to a full-frame lens. Note that, since there is no L size for APS-C lenses, it is assumed that, in a case where the lens is changed to an APS-C lens during shooting with the L size for full-frame lenses, the image size is set to the M size.

Further, the same applies to a case where the APS-C crop function of the imaging apparatus 100 is executed or canceled. APS-C cropping is processing that cuts out the region of the image circle of an APS-C lens in the full-frame lens mounted state to narrow the angle of view. Hence, even when the lens is changed to an APS-C lens after APS-C cropping has been executed in the full-frame lens mounted state and image data of the M size for APS-C has been acquired, image data of the M size having the same number of pixels can be obtained.

In the present technology, in addition to the case where the angle of view size setting unit 107 changes the angle of view size when the lens mounted on the imaging apparatus 100 is changed as described above, there is a case where the angle of view size setting unit 107 changes the angle of view size by execution or cancelation of APS-C cropping. The first angle of view size is set in the APS-C cropping canceled state, and the second angle of view size is set in the APS-C cropping executed state.

Hitherto, it has been difficult to execute or cancel APS-C cropping during the recording of image data since executing or canceling APS-C cropping changes the image size of the image data to be recorded. However, in the present technology, for specific image sizes, the number of pixels and the image size do not change by execution or cancelation of APS-C cropping, so that APS-C cropping can easily be executed or canceled even during the recording of image data.

Figure 4:
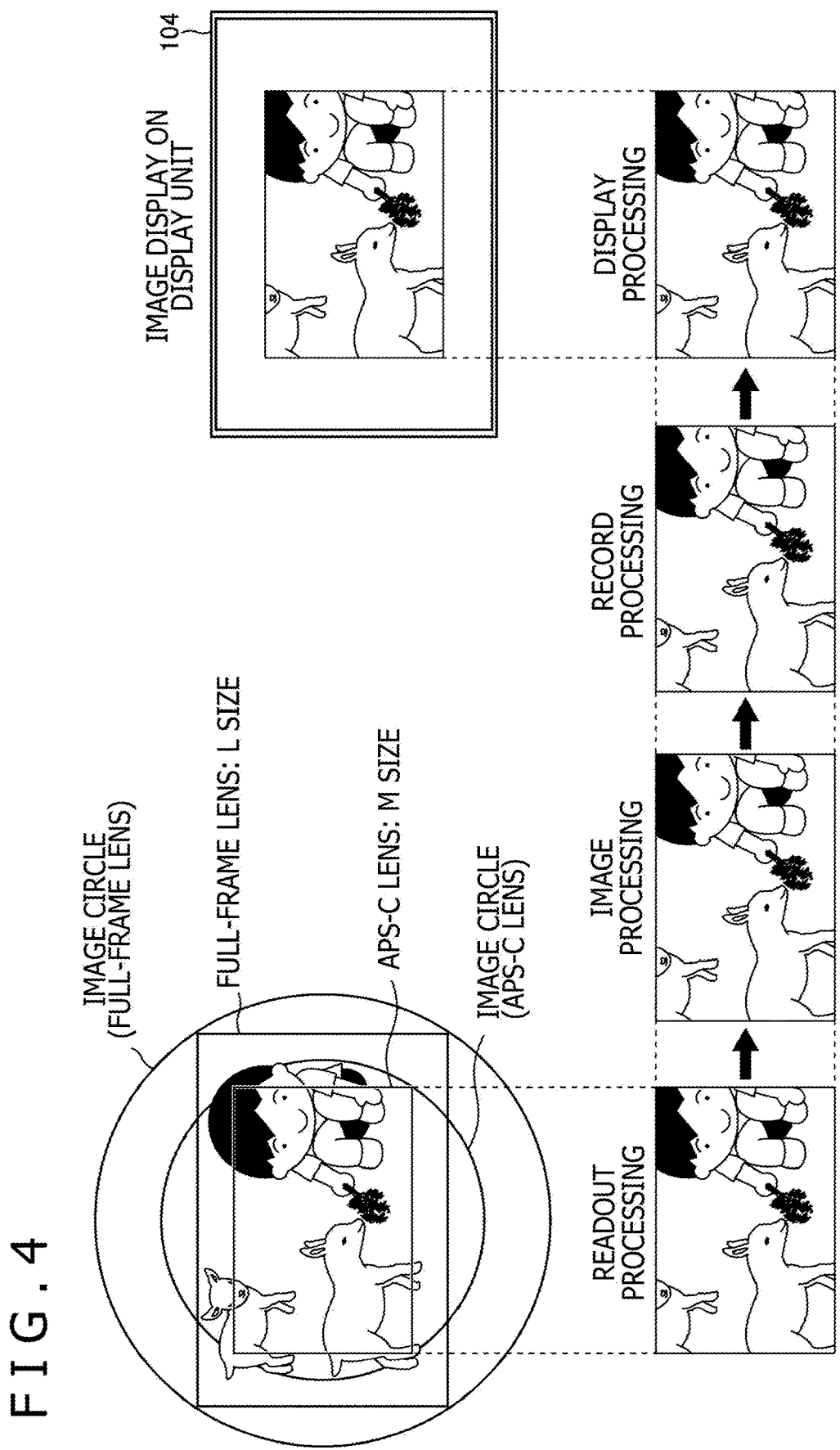
FIG. 4 is an explanatory diagram of a first APS-C cropping method.

APS-C cropping can be achieved by multiple methods. A first method is a method that reads out only the region corresponding to the APS-C image circle from the image sensor 111 of the full-frame size (window reading), as illustrated in FIG. 4. In this case, there is no need to perform processing for APS-C cropping in image processing, record processing, and image display processing.

Figure 5:
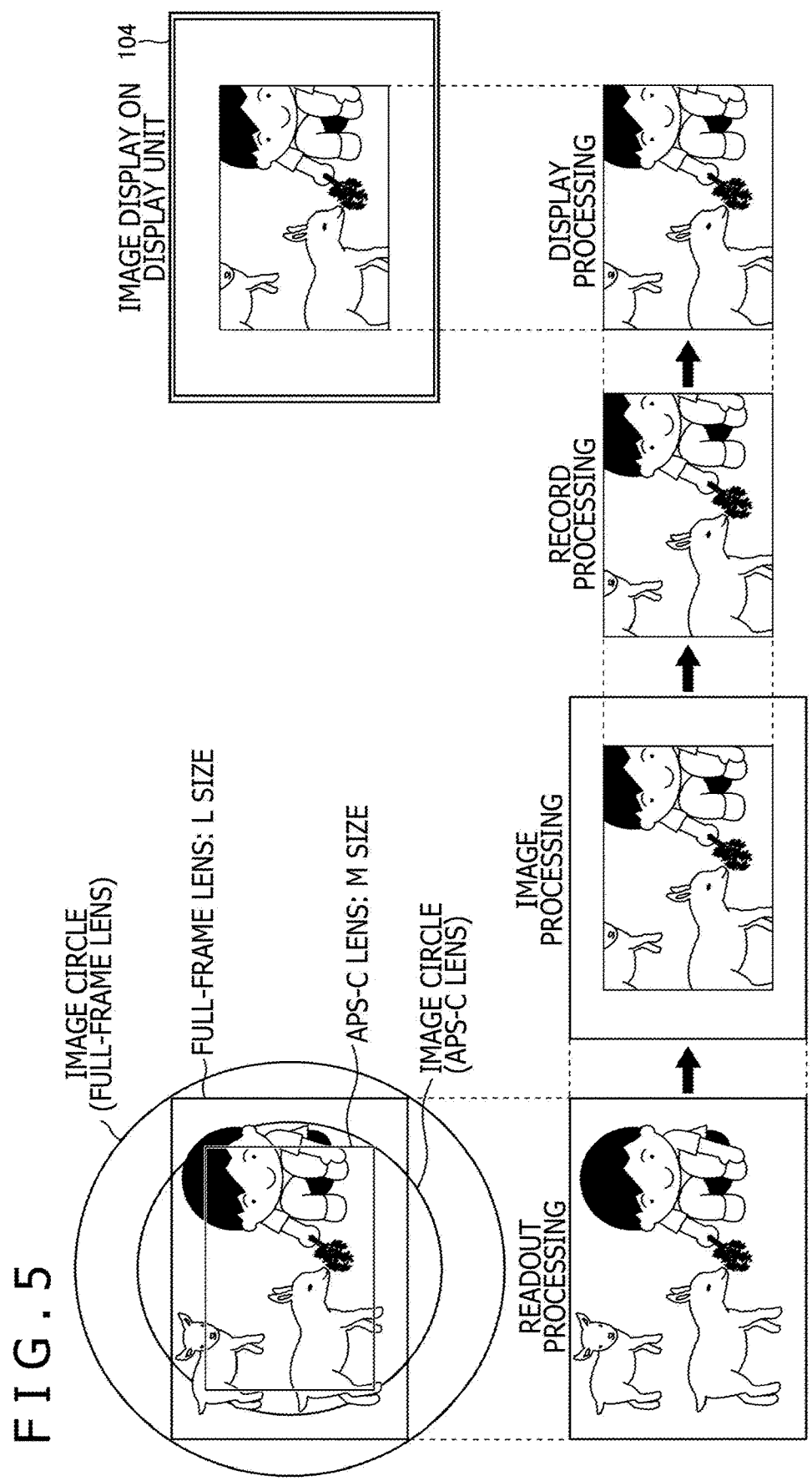
FIG. 5 is an explanatory diagram of a second APS-C cropping method.

A second method is a method that reads out all pixels from the image sensor 111 of the full-frame size and cuts out only the region corresponding to the APS-C image circle in the image processing in the crop processing unit 115, as illustrated in FIG. 5. In this case, there is no need to perform processing for APS-C cropping in record processing and image display processing.

Figure 6:
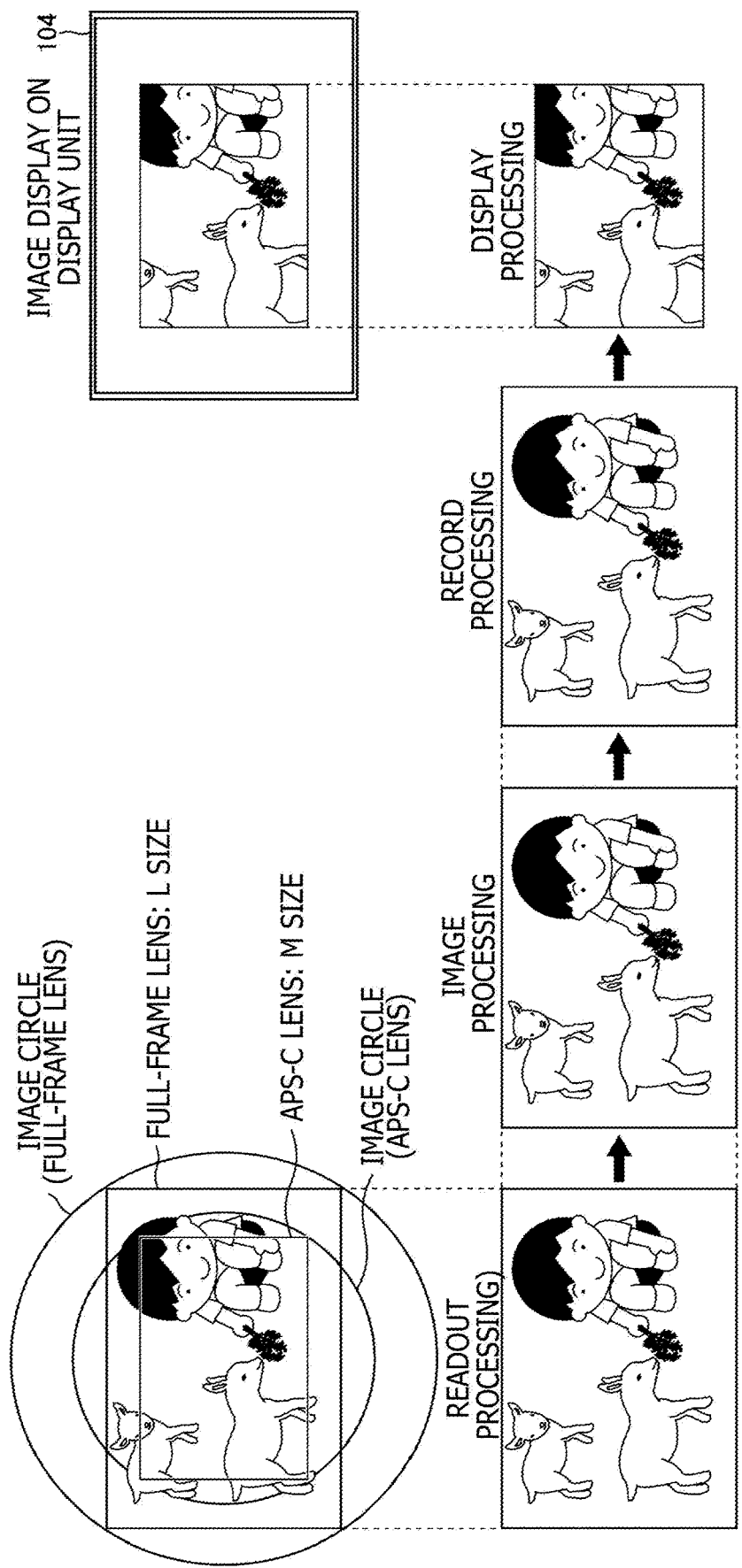
FIG. 6 is an explanatory diagram of a third APS-C cropping method.

A third method is a method that associates angle of view information (angle of view size and angle of view position) indicating the angle of view with image data in advance by the association unit 109 and displays only the angle of view corresponding to the APS-C image circle in reference to the angle of view information when displaying the image data, as illustrated in FIG. 6. In this case, there is no need to perform processing for APS-C cropping in readout processing, image processing, and record processing. In the third method, since there is no change in the data size of image data, problems due to changes in the data sizes of images caused by execution or cancellation of APS-C cropping during shooting, such as the inability to record image data on the recording medium 121 and the need to recalculate the number of savable images, do not occur. Note that, in the third method, the displayed image data may be recorded after being resized and clipped to the displayed angle of view. Note that "data size" in the present technology refers to the quantity of data in image data.

[1-3. Processing in Imaging Apparatus 100]

Figure 7:
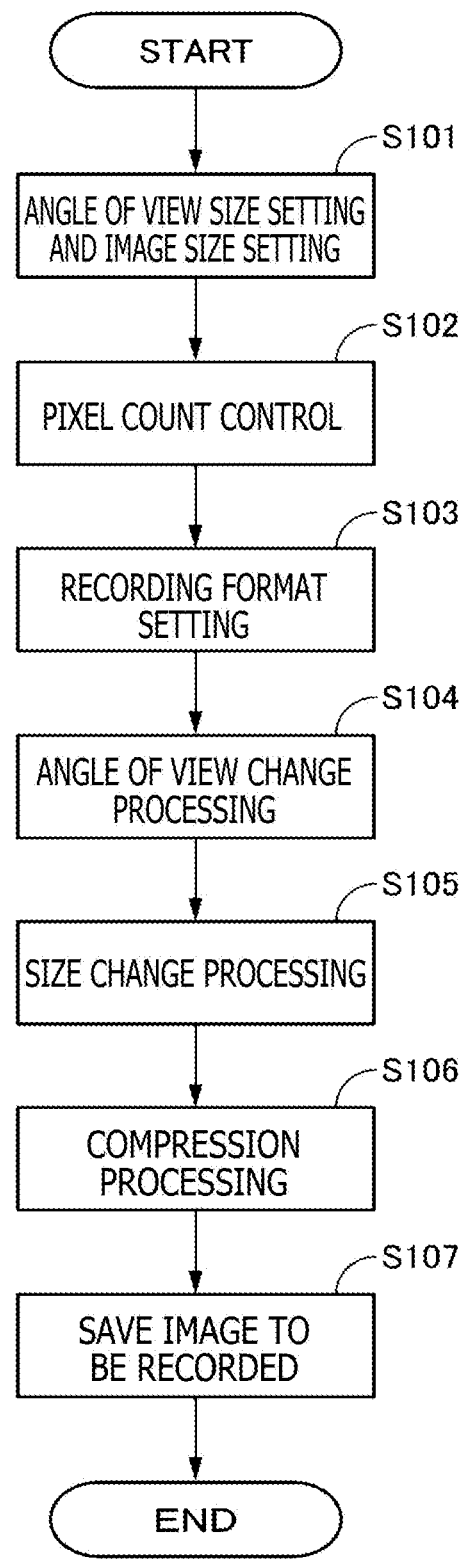
FIG. 7 is a flowchart illustrating the processing in the imaging apparatus.

Next, with reference to FIG. 7, the processing performed in the imaging apparatus 100 is described. Note that APS-C cropping may be performed using any of the first method to the third method, which have been described above, but it is assumed here that APS-C cropping is performed using the second method.

First, in Step S101, the angle of view size setting unit 107 sets the angle of view size, and the image size setting unit 106 sets the image size. Angle of view size information indicating the set angle of view size is supplied to the crop processing unit 115 via the control unit 101.

Next, in Step S102, the control unit 101 sets the number of pixels corresponding to the image size through pixel count control, according to whether the angle of view size is the first angle of view size or the second angle of view size, and further, whether the image size is the L size, the M size, or S the size. Pixel count information indicating the set number of pixels is supplied from the control unit 101 to the resize processing unit 116. As described above, the control unit 101 performs pixel count control such that the number of pixels of the M size for FF and the number of pixels of the M size for APS-C are the same. Further, the control unit 101 performs pixel count control such that the number of pixels of the S size for FF and the number of pixels of the S size for APS-C are the same.

Since the control unit 101 performs pixel count control to set the number of pixels corresponding to the image size in reference to the user's operation input to the operation unit 102, the type of lens mounted on the imaging apparatus 100, the operating mode of the imaging apparatus 100, the recognition result of the recognition processing unit 110, and the like as described above, the control unit 101 needs to refer to those pieces of information.

Further, in Step S103, the recording format setting unit 108 sets the recording format of image data to be saved on the recording medium 121. Note that Step S101, Step S102, and Step S103 are not necessarily required to be performed in this order and may be performed in other orders or almost simultaneously.

Next, in Step S104, the crop processing unit 115 performs crop processing on image data that has undergone white balance processing or the like, in reference to the angle of view information, to change the angle of view.

Subsequently, in Step S105, the resize setting unit changes the number of pixels in reference to the image size information, to change the image size. Note that Step S104 and Step S105 may be performed in the reverse order.

Next, in Step S106, the compression processing unit 120 applies compression processing to the image data that has undergone YC conversion processing or the like.

Then, in Step S107, the image data is recorded on the recording medium 121.

In such a way, the processing in the imaging apparatus 100 is performed.

In the first embodiment, in a case where shooting is performed with the M size setting in the full-frame lens mounted state and then shooting is performed with an APS-C lens with the M size setting after the lens is changed to the APS-C lens, it is possible to obtain image data with the same number of pixels before and after the lens change. This also holds true for a case where shooting is performed with the M size setting in the APS-C lens mounted state and then shooting is performed with a full-frame lens with the M size setting after the lens is changed to the full-frame lens.

Further, in the first embodiment, in a case where shooting is performed with the S size setting in the full-frame lens mounted state and then shooting is performed with an APS-C lens with the S size setting after the lens is changed to the APS-C lens, it is possible to obtain image data with the same number of pixels before and after the lens change. This also holds true for a case where shooting is performed with the S size setting in the APS-C lens mounted state and then shooting is performed with a full-frame lens with the S size setting after the lens is changed to the full-frame lens.

Figure 8:
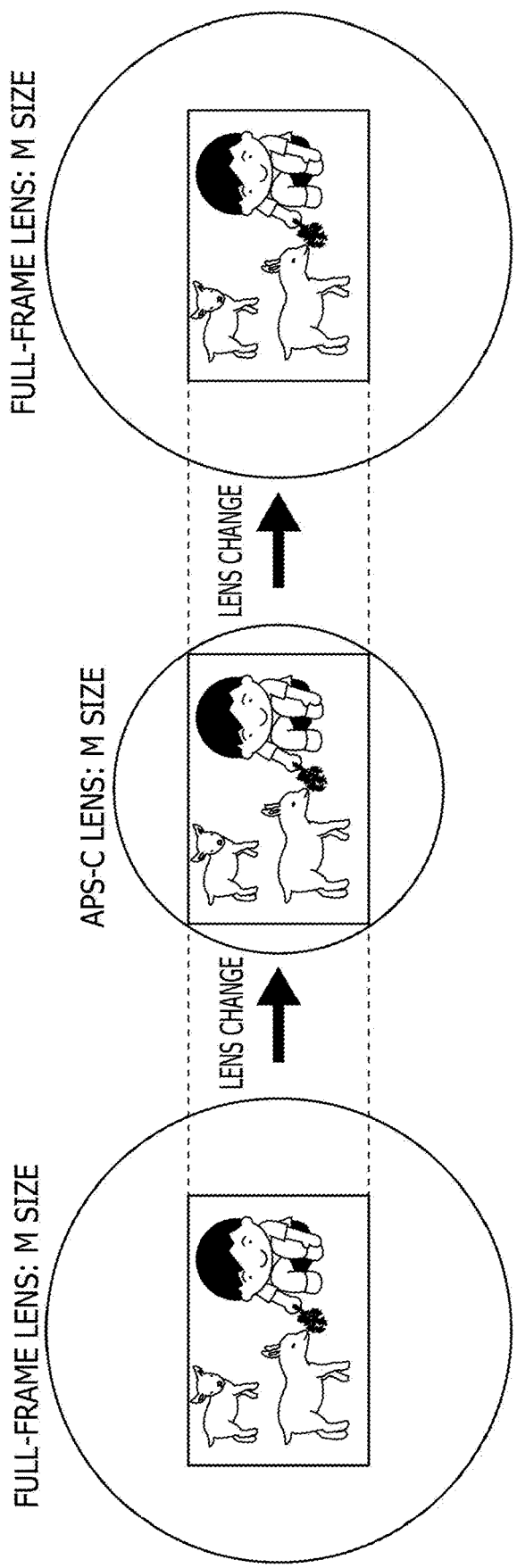
FIG. 8 is an explanatory diagram of lens changes and the image sizes.

With this, as illustrated in FIG. 8, in a case where shooting is performed with the M size setting in the full-frame lens mounted state, then shooting is performed with an APS-C lens with the M size setting after the lens is changed to the APS-C lens, and thereafter shooting is performed with the full-frame lens with the M size setting after the lens is changed to the full-frame lens, it is possible to obtain image data with the same number of pixels in all the cases. This also holds true for a case where shooting is performed with the M size setting in the APS-C lens mounted state, then shooting is performed with a full-frame lens with the M size setting after the lens is changed to the full-frame lens, and thereafter shooting is performed with the APS-C lens with the M size setting after the lens is changed to the APS-C lens.

This also holds true for APS-C cropping. In a case where shooting is performed with the M size setting in the full-frame lens mounted state, and then M size shooting is performed while APS-C cropping is executed, it is possible to obtain image data with the same number of pixels before and after execution of APS-C cropping.

Further, in a case where shooting is performed with the M size setting in the full-frame lens mounted state, then M size shooting is performed while APS-C cropping is executed, and thereafter APS-C cropping is canceled, it is possible to obtain image data with the same number of pixels in all the cases.

When the angle of view size is changed by the angle of view size setting unit 107 according to the type of lens mounted on the imaging apparatus 100, the image size setting unit 106 changes the image size accordingly. With this, as illustrated in FIG. 9, in a case where shooting is performed with the L size setting with the first angle of view size (full-frame lens mounted state) and then shooting is performed with an APS-C lens with the second angle of view size (APS-C lens mounted state) after the lens is changed to the APS-C lens, the image size setting unit 106 changes the image size to the M size.

In a case where shooting is performed with the full-frame lens with the first angle of view size (full-frame lens mounted state) after the lens is changed to the full-frame lens thereafter, the image size setting unit 106 changes the image size to the L size. Further, the control unit 101 performs pixel count control such that the number of pixels of the L size in the full-frame lens mounted state before lens is changed to the APS-C lens and the number of pixels of the L size in the full-frame lens mounted state after the lens is changed from the APS-C lens are the same. With this, the image size and the number of pixels before the lens is changed to the APS-C lens are maintained, so that shooting can be performed with the image size and the number of pixels that are the same as those before the lens is changed to the APS-C lens. Since the size corresponding to the L size for full-frame lenses cannot be set for APS-C lenses, in a case where the lens is changed to an APS-C lens in a state where the size is set to the L size, which is the maximum size for full-frame lenses, the size is switched to the M size, which is the maximum size for APS-C lenses. This also applies to APS-C cropping.

Here, image size setting by the image size setting unit 106 based on shooting-related information and pixel count control by the control unit 101 in a case where the angle of view size setting unit 107 changes the angle of view size are described.

Specifically, there is described pixel count control performed after the angle of view size is changed to the first angle of view size in a case where the angle of view size is changed from the first angle of view size (full-frame lens mounted state) to the second angle of view size (APS-C lens mounted state) and then changed to the first angle of view size (full-frame lens mounted state). As pixel count control in this case, pixel count control is performed by switching, in reference to shooting-related information, between performing pixel count control to make the number of pixels before the angle of view size is changed to the second angle of view size (full-frame lens mounted state) the same as those after the angle of view size is changed to the first angle of view size (full-frame lens mounted state) (first pixel count control), and performing pixel count control to make the number of pixels the same before and after the angle of view size is changed to the first angle of view size (APS-C lens mounted state and second full-frame lens mounted state) (second pixel count control).

First, there is described a case where the shooting-related information is operating mode information indicating the operating mode of the imaging apparatus 100, and the shooting-related information is continuous shooting operation information indicating that the operating mode is a continuous shooting mode.

In a case where the operating mode of the imaging apparatus 100 is the continuous shooting mode, the control unit 101 selects and performs either one of the first pixel count control and the second pixel count control described above that results in a smaller image size. Hence, the image size setting unit 106 sets the image size to the M size. This is because the number of pieces of image data is large in continuous shooting, and thus, it is generally preferred that the data size of images be small in the continuous shooting mode.

Next, there are described cases where the shooting-related information is shooting mode information indicating the shooting mode, object type information indicating the object recognized by the recognition processing unit 110, or shooting scene information indicating the shooting scene.

In a case where the shooting mode of the imaging apparatus 100 is a landscape shooting mode or a case where the object type information indicates that an object is a landscape, either one of the first pixel count control and the second pixel count control described above that results in a larger image size is selected and performed. Hence, the image size setting unit 106 sets the image size to the L size. This is because, in landscape shooting, there is a general tendency to prefer high-resolution images with large image sizes, and many users perform shooting with large image sizes.

Further, in a case where it is indicated by the shooting scene information that shooting is sports scene shooting, either one of the first pixel count control and the second pixel count control described above that results in a smaller image size is selected and performed. Hence, the image size setting unit 106 sets the image size to the M size. This is because, in sports shooting, the number of shots is generally large, and thus, the data size of images is required to be small.

Further, some users use APS-C cropping as zooming. Examples of zooming include smart zooming, super-resolution zooming, and digital zooming. The details of these types of zooming are described later. As illustrated in FIG. 10, in a case where the user executes APS-C cropping during zooming in shooting with a full-frame lens mounted and the angle of view size setting unit 107 changes the angle of view size, the control unit 101 cancels zooming regardless of the zoom magnification.

Further, as illustrated in FIG. 11, also in a case where APS-C cropping is canceled while zooming is being performed during execution of APS-C cropping, the control unit 101 cancels zooming regardless of the zoom magnification. With this, the zoom magnification is maintained, so that the user who is performing shooting can be prevented from getting confused.

[1-4. User Interface]

Figure 12A:
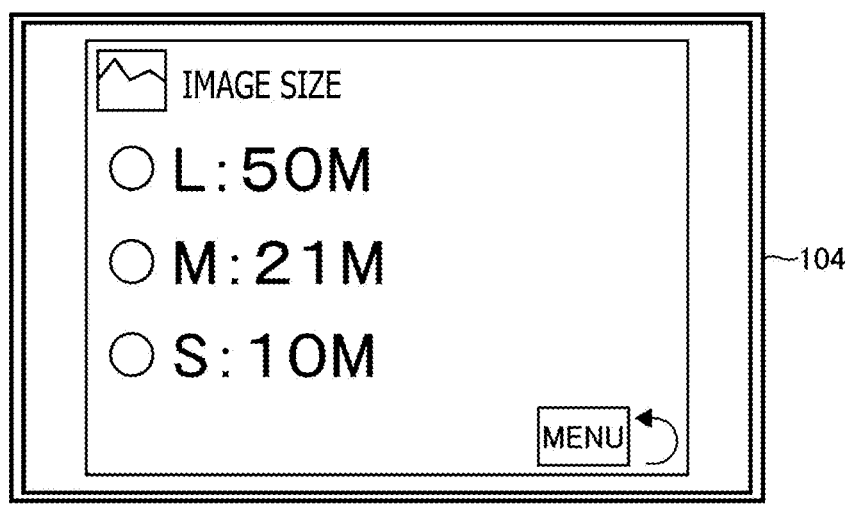
FIGS. 12A, 12B, and 12C are diagrams illustrating an image size selection UI.
Figure 12B:
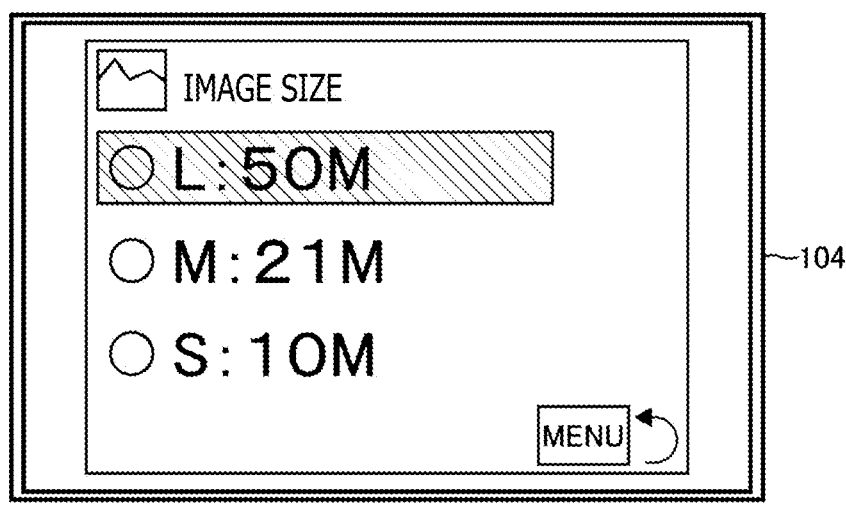
Figure 12C:
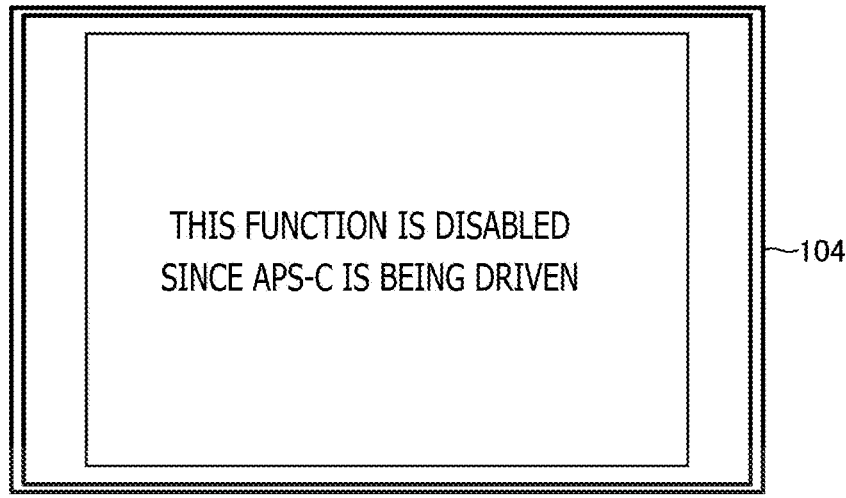

Next, with reference to FIGS. 12A, 12B, and 12C, the user interface in the imaging apparatus 100 is described. First, an image size selection UI that is displayed on the display unit 104 for the user to select the image size is described. Note that the image size selection UI of FIGS. 12A, 12B, and 12C are not limited to either RAW or JPEG and can be used for both RAW and JPEG, as well as other recording formats.

As illustrated in FIG. 12A, in a case where a full-frame lens is mounted on the imaging apparatus 100 (a state where the first angle of view size is set), the settable image sizes are three types: L size, M size, and S size. The three types of sizes are displayed on the display unit 104 to allow the user to select one of the sizes. 50M, 21M, and 10M displayed alongside the respective sizes indicate the number of pixels of the corresponding size. In this way, when each size is displayed, the number of pixels of each size may be displayed, as illustrated in FIG. 12A.

Further, as illustrated in FIG. 12B, in a case where an APS-C lens is mounted on the imaging apparatus 100 (a state where the second angle of view size is set), that is, in a state where the second angle of view size smaller than the first angle of view size is set, the control unit 101 prevents the image size setting unit 106 from setting the L size, which is the maximum image size settable with the first angle of view size. With this, the settable image sizes are two types: M size and S size. The two types of sizes are displayed on the display unit 104 to allow the user to select one of the sizes.

In a case where the angle of view size is set to the second angle of view size, the L size cannot be selected, and thus, it is preferred to gray out the L size to indicate to the user that the L size cannot be selected, as illustrated in FIG. 12B, for example. Note that the L size may be hidden to make it impossible to select the L size, but in that case, the user may misunderstand or feel uncomfortable with the lack of the L size. Hence, displaying the L size while graying out the L size makes it possible to indicate to the user that the L size exists but cannot be selected for the APS-C size. Note that, graying out is merely an example, and any display mode that can indicate to the user that the L size exists but cannot be selected may be used.

Note that, in a case where the user performs an input operation to select the L size, it is preferred to display the reason why the L size cannot be selected, as illustrated in FIG. 12C. With this, the user can surely be notified of the fact that the L size cannot be selected.

Next, a zoom magnification setting UI that is displayed on the display unit 104 for the user to set the zoom magnification is described.

First, the zoom functions of the imaging apparatus 100 are described. The imaging apparatus 100 has, as functions that achieve zooming by signal processing, zoom functions of three modes: smart zooming, super-resolution zooming, and digital zooming. Note that the imaging apparatus 100 has an optical zoom function other than those, but optical zooming is omitted here.

Smart zooming has a zoom magnification of 1.0× or less for images and causes no degradation in image quality. In a case where the image size is the L size that is the maximum image size within the image circle in the full-frame lens mounted state, the control unit 101 disables smart zooming. Further, also in a case where the image size is the M size that is the maximum image size within the image circle in the APS-C lens mounted state, the control unit 101 disables smart zooming.

Super-resolution zooming has a zoom magnification of 2.0× or less for images. Super-resolution zooming has a greater degree of degradation than smart zooming but has a smaller degree of degradation than digital zooming owing to the use of super-resolution zooming-specific interpolation algorithms, which are different from linear interpolation, AI (Artificial Intelligence), or the like. When the zoom magnification exceeds 2.0×, the imaging apparatus 100 transitions to digital zooming instead of super-resolution zooming. Note that a function similar to super-resolution zooming is called by a name different from super-resolution zooming in some cases.

Digital zooming has a zoom magnification greater than 2.0× for images but has a greater degree of degradation in image quality than super-resolution zooming due to the use of general linear interpolation.

In such a way, the imaging apparatus 100 has the zoom functions of the multiple modes, and the control unit 101 changes the number of zoom functions of settable modes among the zoom functions of the multiple modes depending on the image size set by the image size setting unit 106.

Further, the control unit 101 changes a zoom magnification adjustment UI that is displayed on the display unit 104, depending on the number of settable zoom functions.

A concrete example of the zoom magnification adjustment UI is described. FIG. 13 illustrates a zoom magnification setting UI extracted from a shooting UI that is displayed on the display unit 104. The zoom magnification setting UI includes a magnification value display indicating the current magnification and a zoom bar Z. The zoom bar Z includes an icon IC indicating the current zoom magnification by its position on the zoom bar Z. The state where the icon IC is at the left end of the zoom bar Z represents the smallest zoom magnification, and as the icon IC moves to the right, the zoom magnification increases. The state where the icon IC is at the right end of the zoom bar Z represents the largest zoom magnification.

Further, the zoom bar Z is divided into multiple regions to indicate the types of zooming. Since smart zooming cannot be used for the L size in the full-frame lens mounted state, the zoom bar Z is divided into two regions. A first region Z1 of the zoom bar Z corresponds to the zoom magnification of super-resolution zooming, and a second region Z2 corresponds to the zoom magnification of digital zooming. This also applies to the M size in the APS-C lens mounted state. This UI including the zoom bar Z having the two regions is referred to as a "two-step zooming UI." When the user operates the icon IC to increase the zoom magnification, super-resolution zooming is executed while the icon IC is within the first region Z1, and digital zooming is executed when the icon IC enters the second region Z2.

Further, since three types of zooming can be used for the M size in the full-frame lens mounted state, the zoom bar Z is divided into three regions. The first region Z1 of the zoom bar Z corresponds to the zoom magnification of smart zooming, the second region Z2 corresponds to the zoom magnification of super-resolution zooming, and a third region Z3 corresponds to the zoom magnification of digital zooming. This also applies to the S size in the full-frame lens mounted state and the S size in the APS-C lens mounted state. This UI including the zoom bar Z having the three regions is referred to as a "three-step zooming UI." When the user operates the icon IC to increase the zoom magnification, smart zooming is executed while the icon IC is within the first region Z1, super-resolution zooming is executed when the icon IC enters the second region Z2, and digital zooming is executed when the icon IC enters the third region Z3.

Accordingly, when the image size is changed from the L size to the M size in the full-frame lens mounted state, the zoom magnification setting UI transitions from the two-step zooming UI to the three-step zooming UI. In contrast, when the image size is changed from the M size to the L size in the full-frame lens mounted state, the zoom magnification setting UI transitions from the three-step zooming UI to the two-step zooming UI. Note that, in a case where the image size is changed from the M size to the S size or from the S size to the M size in the full-frame lens mounted state, the three-step zooming UI remains.

Further, in a case where the lens is changed to an APS-C lens from a full-frame lens mounted state with the image size of the L size, as described above, the image size is automatically switched to the M size, and the zoom magnification setting UI remains as the two-step zooming UI. In contrast, in a case where the lens is changed to a full-frame lens from an APS-C lens mounted state with the image size of the M size, as described above, the image size is automatically switched to the L size, and the zoom magnification setting UI remains as the two-step zooming UI.

Further, in a case where the lens is changed to an APS-C lens from a full-frame lens mounted state with the image size of the M size, the image size remains as the M size, and the zoom magnification setting UI transitions from the three-step zooming UI to the two-step zooming UI. In contrast, in a case where an APS-C lens mounted with the image size of the M size is changed to a full-frame lens, the image size remains as the M size, and the zoom magnification setting UI transitions from the two-step zooming UI to the three-step zooming UI.

Further, when the image size is changed from the M size to the S size in the APS-C lens mounted state, the UI transitions from the two-step zooming UI to the three-step zooming UI. In contrast, when the image size is changed from the S size to the M size in the APS-C lens mounted state, the UI transitions from the three-step zooming UI to the two-step zooming UI.

Since available zoom functions differ depending on the combination of the type of lens mounted on the imaging apparatus 100 and the image size, the zoom magnification setting UI is changed according to the type of lens and the image size as described above, to make it easy for the user to adjust the zoom magnification.

Note that, four or more types of zooming may be supported, and the zoom bar Z may be divided into four or more regions. Further, in FIG. 13, for the M size and the S size in the full-frame lens mounted state, the zoom bar Z is divided at the same positions, and the widths of the respective regions are the same. However, the zoom bar Z is not necessarily required to be divided at the same positions, and the widths of the respective regions may be different.

[1-5. Image Size and Recording of Image Data]

Figure 14:
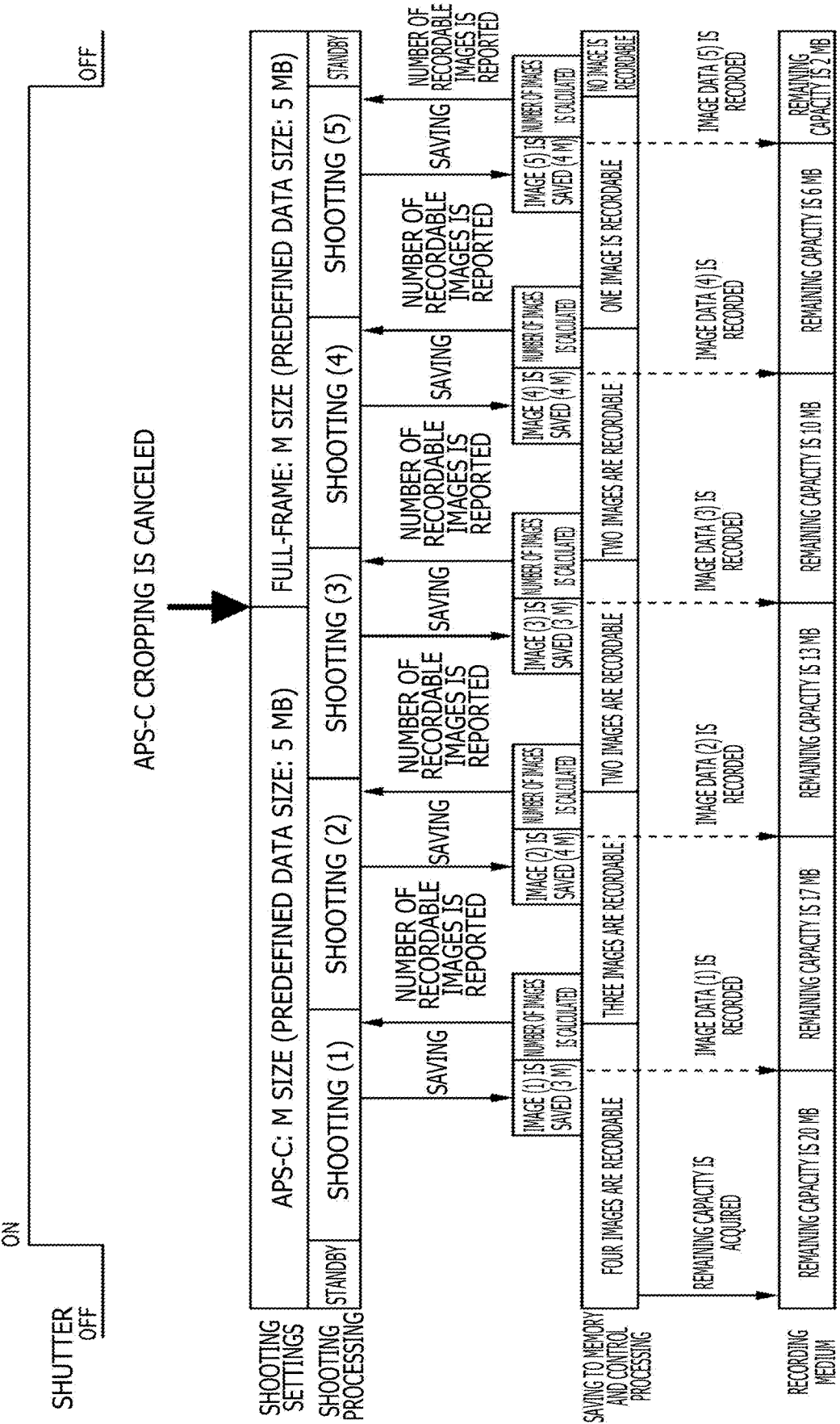
FIG. 14 is an explanatory diagram of the relation between the image size and the number of recordable images.

Next, with reference to FIG. 14, the relation between the image size and the recording of image data on the recording medium 121 is described. FIG. 14 illustrates the saving processing and control processing of image data on the buffer memory 112 and the record processing of image data on the recording medium 121, which are performed by turning on and off the shutter, shooting processing, the control unit 101, and the like.

FIG. 14 illustrates a case where APS-C cropping is canceled during continuous shooting with a full-frame lens mounted with the image size set to the M size for APS-C by execution of APS-C cropping, and continuous shooting continues. In this case, the image size is changed from the M size for APS-C to the M size for FF before and after cancelation of APS-C cropping, and the control unit 101 performs the second pixel count control described above, to control the number of pixels to be the same before and after the angle of view size is changed to the first angle of view size (APS-C lens mounted state and full-frame lens mounted state). In a state where APS-C cropping is executed in the full-frame lens mounted state, the second angle of view size is set, and when APS-C cropping is canceled, the first angle of view size is set.

It is assumed that the predefined data size of image data of the M size for APS-C is 5 MB, and the predefined data size of image data of the M size for FF is 5 MB.

First, the remaining capacity of the recording medium 121 is acquired by control processing. Then, the number of recordable images is calculated and reported. Here, for example, it is assumed that the remaining capacity of the recording medium 121 is 20 MB and the number of recordable images is four. The number of recordable images can be calculated from the fact that the remaining capacity of the recording medium 121 is 20 MB and the predefined data size of image data of the M size for APS-C is 5 MB.

When shooting (1) is executed by shooting processing and image data (1) is saved in the buffer memory 112, the number of recordable images on the recording medium 121 is calculated. It is assumed that the image data (1) is 3 MB (the predefined data size of 5 MB is only a standard, and the data size of image data actually obtained by shooting may not be 5 MB in some cases). Thus, the number of recordable images is three, and the number of recordable images is reported. Further, the image data (1) is recorded on the recording medium 121, and the remaining capacity of the recording medium 121 becomes 17 MB.

Next, when shooting (2) is executed by shooting processing and image data (2) is saved in the buffer memory 112, the number of recordable images on the recording medium 121 is calculated. It is assumed that the image data (2) is 4 MB. Thus, the number of recordable images is two, and the number of recordable images is reported. Further, the image data (2) is recorded on the recording medium 121, and the remaining capacity of the recording medium 121 becomes 13 MB.

It is assumed that, while shooting (3) is being executed by shooting processing, APS-C cropping is canceled and the image size is changed from the M size for APS-C to the M size for FF. As described above, in the present embodiment, the number of pixels corresponding to an image size is the same for the M size for APS-C and the M size for FF, and thus, the predefined data size for calculating the number of recordable images is also the same.

In a case where the predefined data size for calculating the number of recordable images is changed, it is impossible to accurately calculate the number of recordable images, causing a period in which the number of recordable images is undetermined and a need to stop shooting. However, performing pixel count control such that the number of pixels corresponding to an image size is the same for the M size for APS-C and the M size for FF allows the predefined data size to remain the same even when the angle of view size is changed. Thus, there is no need to stop shooting or change the predefined data size for calculating the number of recordable images, with no period in which the number of recordable images is undetermined. Accordingly, it is possible to perform shooting (3) similarly to shooting (1) and shooting (2), save the image data in the buffer memory 112, calculate the number of recordable images, and record image data on the recording medium 121 until the limit of the remaining capacity of the recording medium 121 is reached.

[1-6. Recording Format of Image Data]

Next, with reference to FIG. 15, the recording formats of image data of the respective image sizes with the first angle of view size (full-frame lens mounted state) and the second angle of view size (APS-C lens mounted state) are described.

Here, Bayer RAW, YUV 420, and YUV 422 are used as the recording formats of image data. Bayer RAW is image data based on the array of color filters of the image sensor 111 itself, which is called a "Bayer array." YUV is one of the representation formats of color information and is a format that represents colors by the combination of three values: a luminance signal (Y), the difference between a luminance signal and a blue component (U), and the difference between a luminance signal and a red component (V). YUV 422 is a format of the YUV format that reduces data quantity while preventing degradation in image quality by treating adjacent two pixels as a set to share some information. YUV 422 decimates color difference pixels only in the horizontal direction and is thus higher in image quality than YUV 420. Meanwhile, YC 420 is a format that takes four samples of the luminance signal (Y) from four pixels, one sample of the difference between a luminance signal and a blue component (U) from two pixels in the upper row, and one sample of the difference between a luminance signal and a red component (V) from two pixels in the lower row. YUV 420 decimates color difference pixels in both the horizontal direction and the vertical direction. YUV 420 is thus low in image quality but can achieve a small data size, as compared to YUV 422.

In a first recording format example, Bayer RAW is used for the L size in the full-frame lens mounted state. Further, YUV 420 is used for both the M size in the full-frame lens mounted state and the M size in the APS-C lens mounted state. Further, YUV 422 is used for both the S size in the full-frame lens mounted state and the S size in the APS-C lens mounted state. The M size in the full-frame lens mounted state and the M size in the APS-C lens mounted state have the same number of pixels, and the S size in the full-frame lens mounted state and the S size in the APS-C lens mounted state have the same number of pixels. Thus, this first recording format example is an example in which the recording format is standardized for each image size.

In a second recording format example, Bayer RAW is used for the L size in the full-frame lens mounted state. Further, YUV 420 is used for the M size in the full-frame lens mounted state, and Bayer RAW is used for the M size in the APS-C lens mounted state. Further, YUV 422 is used for the S size in the full-frame lens mounted state, and YUV 420 is used for the S size in the APS-C lens mounted state. In this second recording format example, the L size in the full-frame lens mounted state and the M size in the APS-C lens mounted state, which are not required to be reduced, are recorded as original Bayer RAW image data. In a case where image data is to be reduced, priority is given to reducing the data size, and the image data is converted to YUV 420 for a one-size reduction and converted to YUV 422 for a two-size reduction.

In a third recording format example, Bayer RAW is used for the L size in the full-frame lens mounted state. Further, YUV 422 is used for the M size in the full-frame lens mounted state, and Bayer RAW is used for the M size in the APS-C lens mounted state. Further, YUV 422 is used for both the S size in the full-frame lens mounted state and the S size in the APS-C lens mounted state. In this third recording format example, the L size in the full-frame lens mounted state and the M size in the APS-C lens mounted state, which are not required to be reduced, are recorded as original Bayer RAW image data. In a case where image data is to be reduced, priority is given to the image quality, and the image data is converted to YUV 422.

In a fourth recording format example, Bayer RAW is used for the L size in the full-frame lens mounted state. Further, YUV 420 is used for the M size in the full-frame lens mounted state, and Bayer RAW is used for the M size in the APS-C lens mounted state. Further, YUV 420 is used for both the S size in the full-frame lens mounted state and the S size in the APS-C lens mounted state. In this fourth recording format example, the L size in the full-frame lens mounted state and the M size in the APS-C lens mounted state, which are not required to be reduced, are recorded as original Bayer RAW image data. In a case where image data is to be reduced, priority is given to reducing the data size, and the image data is converted to YUV 420.

In a fifth recording format example, YUV 422 is used for all the sizes in the full-frame lens mounted state and the APS-C lens mounted state. In this fifth recording format example, it is possible to prioritize image quality over YUV 420 for all the image sizes.

In a sixth recording format example, YUV 420 is used for all the sizes in the full-frame lens mounted state and the APS-C lens mounted state. In this sixth recording format example, it is possible to reduce the data sizes of all the image sizes.

In the present embodiment, in which the number of pixels of the M size is the same for the full-frame lens mounted state and the APS-C lens mounted state and the number of pixels of the S size is the same for the full-frame lens mounted state and the APS-C lens mounted state, the first recording format example is the most desirable as the recording format of image data.

However, the recording format of image data is not limited to the first example and may be any of the first to sixth examples. Further, the recording format of image data is not limited to any of the first to sixth examples and may be set by the user as desired. For example, Bayer RAW may be used for all the sizes in the full-frame lens mounted state and the APS-C lens mounted state.

Figure 16:
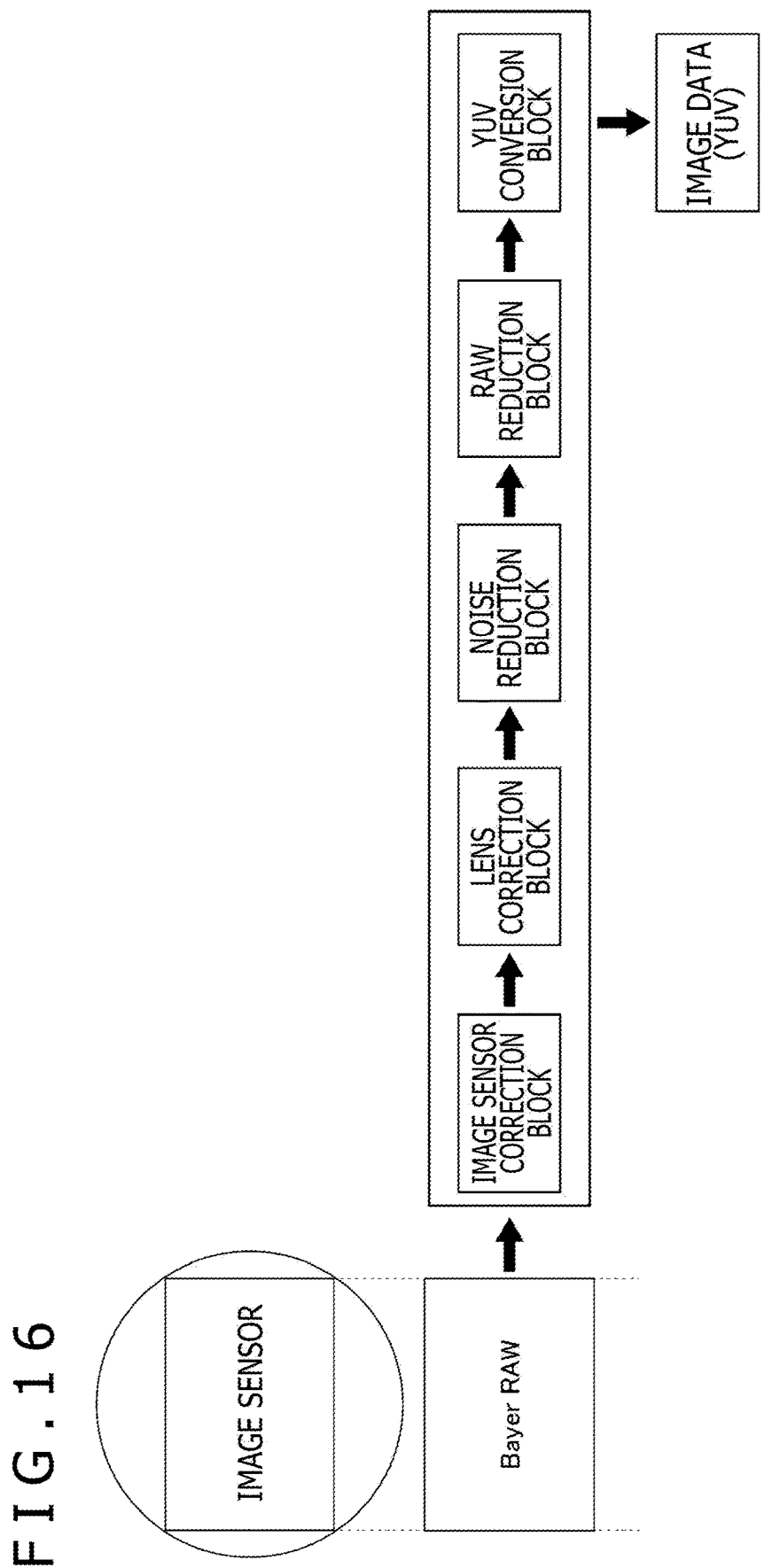
FIG. 16 is an explanatory diagram of conversion processing from RAW to YUV.

The conversion from Bayer RAW to YUV can be performed by application of correction of the image sensor 111, lens correction, noise reduction, RAW reduction, and YUV conversion to Bayer RAW image data, as illustrated in FIG. 16.

The first embodiment is configured as described above. According to the first embodiment, for the specific image sizes, even when the lens mounted on the imaging apparatus 100 is changed or the crop function is executed or canceled, it is possible to obtain image data with the same number of pixels, that is, the same image size. With this, a new experience in photography that does not require attention to the type of lens can be achieved and provided to users.

2. Second Embodiment

[2-1. Configuration of Imaging Apparatus 100]

Next, the second embodiment of the present technology is described. The configuration of the imaging apparatus 100 is similar to that of the first embodiment, and thus, the description thereof is omitted.

In the second embodiment, the compression processing unit 120 acquires recording format information from the recording format setting unit 108 and performs any of lossy compression, lossless compression, and non-compression on image data according to the set recording format.

Lossy compression is a compression format in which the compressed and decompressed data does not perfectly match the data available before compression, and the compressed data cannot be restored to its original state. Lossy compression is also called "lossy compression." For static images, there is JPEG. For moving images, there are MPEG-1 (Moving Picture Experts Group), MPEG-2, and the like. Note that, lossy compression according to the second embodiment is performed using a known method, and thus, the description thereof is omitted.

Lossless compression is a compression method in which the compressed and decompressed data perfectly matches the data available before compression, and the compressed data can be restored to its original state. Lossless compression is also called "lossless compression."

[2-2. Processing in Imaging Apparatus 100]

Figure 17:
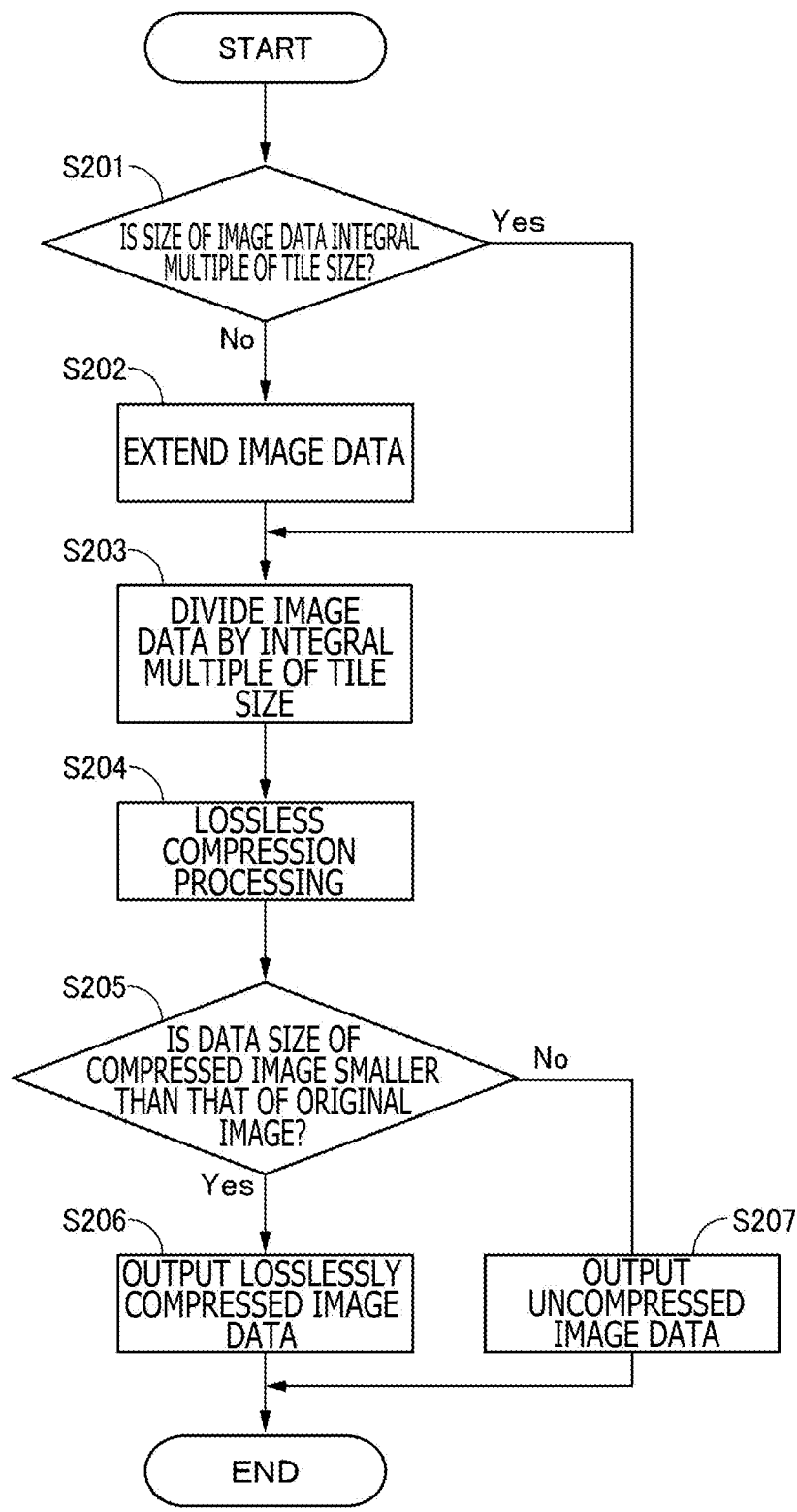
FIG. 17 is a flowchart illustrating lossless compression processing.

Next, with reference to FIG. 17, the lossless compression processing by the compression processing unit 120 according to the second embodiment is described.

First, in Step S201, it is determined whether the vertical size and horizontal size of image data that is the target of compression processing match an integral multiple of a square tile with a predetermined size. In a case where the size of the image data is not an integral multiple of the predetermined tile size, the processing proceeds to Step S202 (No in Step S201).

Figure 18A:
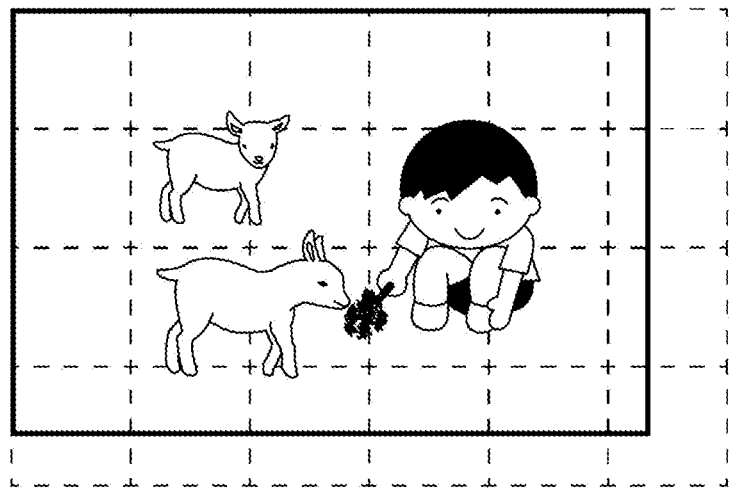
FIGS. 18A and 18B depict explanatory diagrams of determining whether image data is an integral multiple of a tile size or not.
Figure 18B:
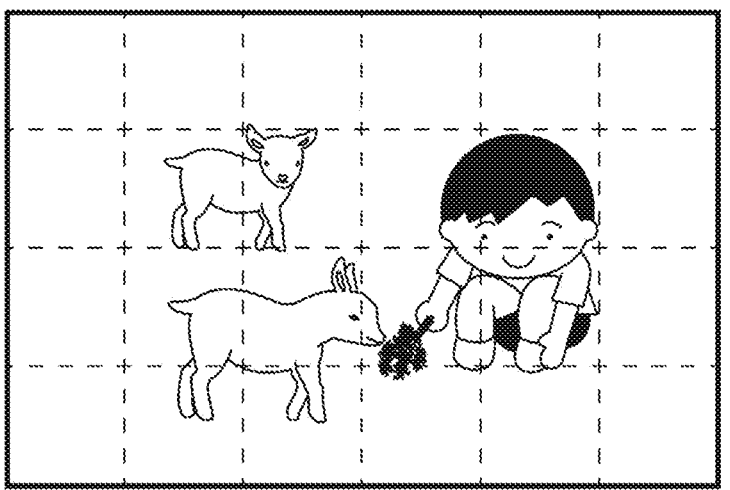

The case where the vertical size and horizontal size of image data do not match an integral multiple of a square tile is a state as illustrated in FIG. 18A. Further, the case where the vertical size and horizontal size of image data match an integral multiple of a square tile is a state as illustrated in FIG. 18B. In FIGS. 18A and 18B, the image data is represented by the solid line, and the tiles are represented by the broken lines.

Note that, there is no predefined tile size, and any size may be used. A default tile size may be set in advance in the imaging apparatus 100, or the tile size may be adjusted and changed as desired. Note that, even with a tile size set as desired, it is not always possible to divide image data by an integral multiple. This is because the number of pixels of image data cannot be divided by an integer value in some cases.

Further, the tile size may be adjusted depending on the image size. For example, in a case where there is an upper limit to the number of tiles in an algorithm for compression processing and the image size is too large to divide the entire image data into tiles with the maximum number of tiles, the tile size is increased. For example, the default size of one tile is set to 512×512, and the tile size is doubled to 1024×1024 in a case where the tile size is increased.

Figure 19A:
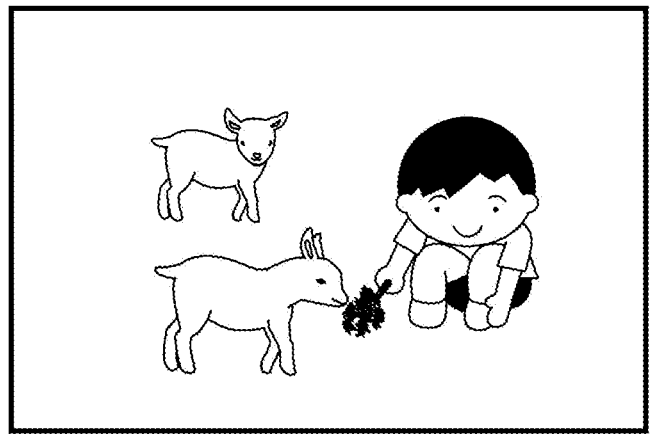
FIGS. 19A, 19B, and 19C depict explanatory diagrams of dividing image data into tiles.
Figure 19B:
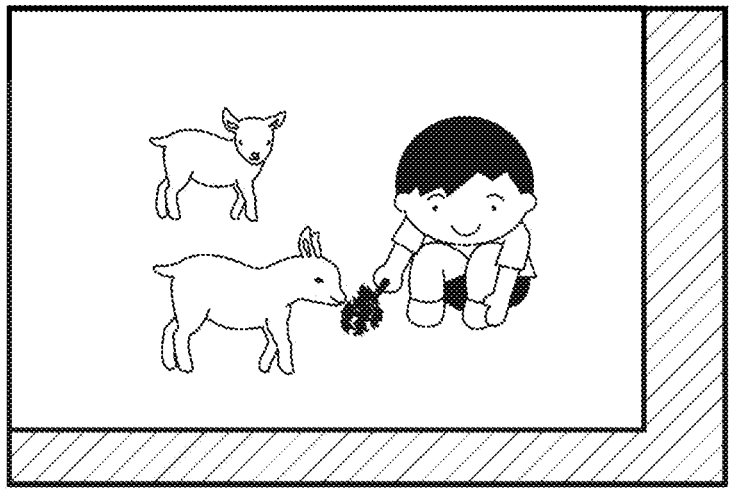

Next, in Step S202, the image data is extended such that the vertical size and horizontal size of the image data match an integral multiple of the tile. In a case where the image data of FIG. 19A is the processing target, to extend the image data, margins are added to the vertical and horizontal sides of the image data, as illustrated in FIG. 19B, such that the vertical size and horizontal size of the image data including the margins match an integral multiple of the tile, as illustrated in FIG. 19C.

Note that image data extension is performed by adding a single piece of information as margins in order to enhance the compression efficiency. A single piece of information is information regarding a signal level of 0 (with a color of black) and represents nothing. Adding margins extends the image data and increases the image size without changing the angle of view.

Figure 19C:
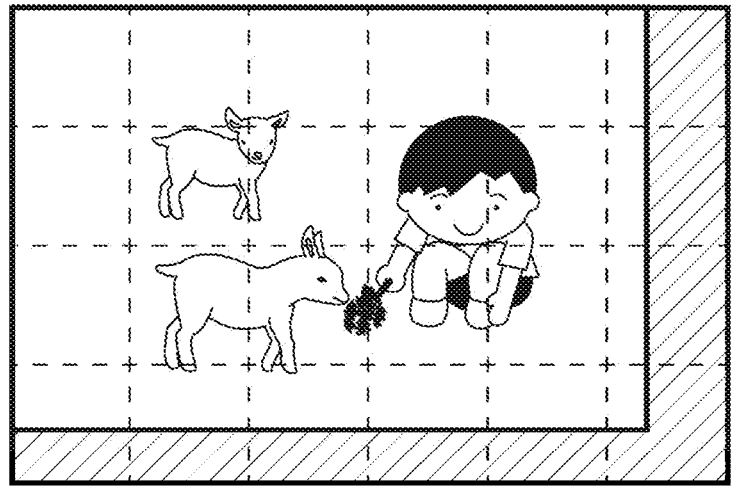

Next, in Step S203, the image data including the added margins as illustrated in FIG. 19C is divided by the integral multiple of the tile size. Subsequently, in Step S204, the compression processing unit 120 applies lossless compression processing to the image data in a state of being divided into tiles, with use of a predetermined compression algorithm.

Next, in Step S205, it is determined whether the data size of the losslessly compressed image data is smaller than the data size before compression. In a case where the data size of the losslessly compressed image data is smaller than the data size before compression, the processing proceeds to Step S206 (Yes in Step S205), and the compression processing unit 120 outputs the losslessly compressed image data. Further, the losslessly compressed image data is recorded on the recording medium 121.

On the other hand, in a case where the data size of the losslessly compressed image data is larger than the data size before compression, the processing proceeds to Step S207 (No in Step S205), and the compression processing unit 120 outputs the uncompressed image data that has not undergone lossless compression. The image data that has not undergone lossless compression is recorded on the recording medium 121.

Note that, in a case where the image data which has the lossless compression setting as the recording format set by the recording format setting unit 108 but has not undergone lossless compression in Step S207 is output, it is preferred to include information indicating that "the recording format is lossless compression" in the metadata associated with the image data. For example, when the user organizes the image data recorded on the recording medium 121, he/she can accurately sort, by referring to the metadata, the image data recorded with the lossless compression setting (including image data that has not undergone lossless compression in Step S207 as described above) and other image data. Examples of metadata include Exif (Exchangeable Image File Format).

Note that the determination processing in Step S201 and Step S205 may be performed by the control unit 101.

Figure 20A:
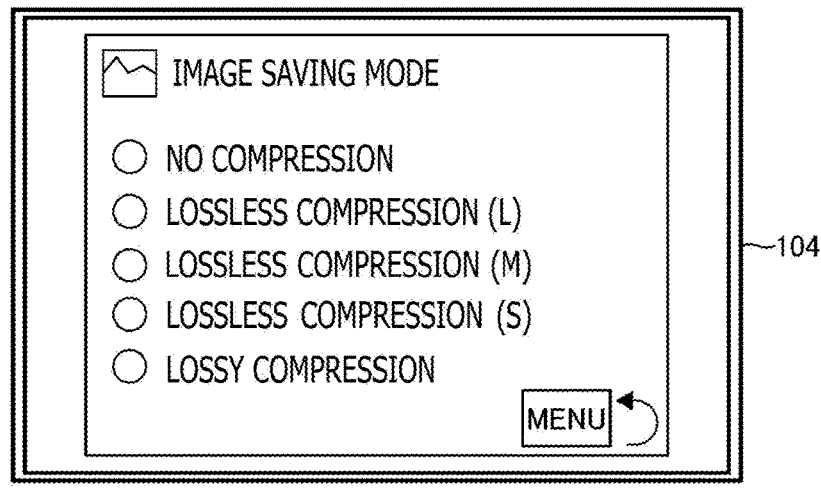
FIGS. 20A and 20B depict diagrams illustrating a compression format selection UI.
Figure 20B:
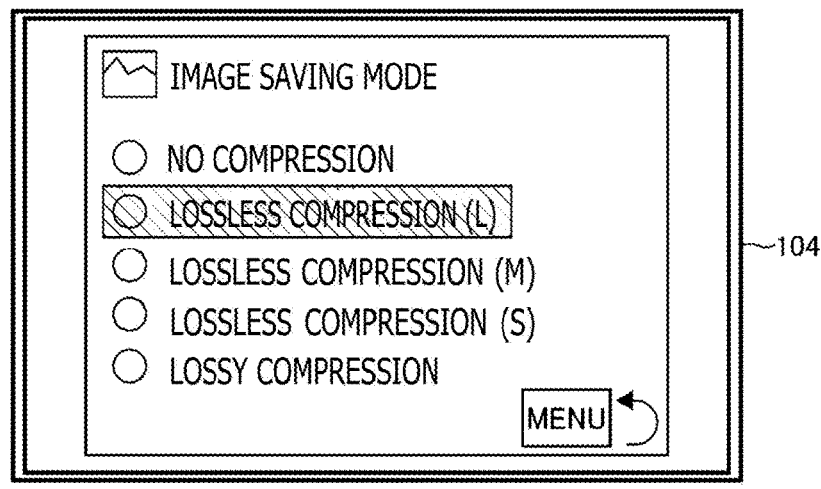

FIGS. 20A and 20B are compression format selection UI that is displayed on the display unit 104. FIG. 20A is a compression format selection UI in the full-frame lens mounted state. In the full-frame lens mounted state, no compression, L size, M size, and S size for lossless compression, and lossy compression are selectable. Note that the compression format selection UI of FIGS. 20A and 20B are not limited to either RAW or JPEG and can be used for both RAW and JPEG.

FIG. 20B is a compression format selection UI in the APS-C lens mounted state. In the APS-C lens mounted state, no compression, M size and S size for lossless compression, and lossy compression are selectable. As described above, the L size cannot be selected in the APS-C lens mounted state, and thus, it is preferred to gray out the L size for lossless compression to indicate to the user that the L size cannot be selected. Note that the L size for lossless compression may be hidden to make it impossible to select the L size, but in that case, the user may misunderstand or feel uncomfortable with the lack of the L size. Hence, displaying the L size while graying out the L size makes it possible to indicate to the user that the L size exists but cannot be selected for the APS-C size. Note that, graying out is merely an example, and any display mode that can indicate to the user that the L size exists but cannot be selected may be used.

Note that, in the example illustrated in FIGS. 20A and 20B, image size selection cannot be made in no compression and lossy compression in both the full-frame lens mounted state and the APS-C lens mounted state, but in a case where there is an algorithm that can generate RAW images in the M size and the S size, image size selection can be made.

Note that compression algorithms for lossless compression and lossy compression may be the same or different between the full-frame lens mounted state and the APS-C lens mounted state.

The second embodiment is configured as described above. According to the second embodiment, even in a case where the size of image data is not an integer multiple of the tile size, the image data can be losslessly compressed. Further, in a case where the data size obtained as a result of lossless compression is larger than the data size before lossless compression, the original image data before compression is recorded, so that the recording of image data with unnecessarily large data sizes can be prevented.

3. Modified Example

The embodiments of the present technology have specifically been described above. However, the present technology is not limited to the embodiments described above, and various modifications based on the technical ideas of the present technology are possible.

Figure 21:
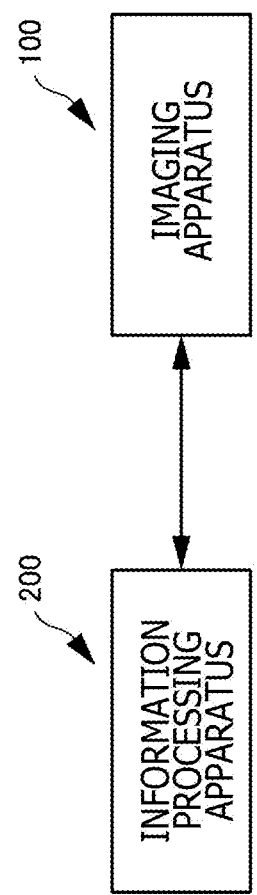

In the description of the embodiments, the imaging apparatus 100 includes the control unit 101, the image size setting unit 106, and the angle of view size setting unit 107. However, as illustrated in FIG. 21, an information processing apparatus 200 configured to perform the processing as the control unit 101, the image size setting unit 106, and the angle of view size setting unit 107 may be configured, and the information processing apparatus 200 may be connected to the imaging apparatus 100 via the interface 103 or the like to perform the processing. The information processing apparatus 200 may be configured as a standalone apparatus or configured on a server, a cloud, or the like. Further, the imaging apparatus 100 may have the function as the information processing apparatus 200. Moreover, the information processing apparatus 200 may be configured by a program, and the imaging apparatus 100 may achieve the function of the information processing apparatus 200 by executing the program.

The present technology can also take the following configurations.

(1)

An imaging apparatus including:

an image size setting unit configured to set a set image size selected from multiple settable image sizes;

an angle of view size setting unit configured to set a set angle of view size selected from multiple settable angle of view sizes that include a first angle of view size and a second angle of view size; and a control unit configured to perform pixel count control on the set image size set by the image size setting unit, to achieve the same or almost the same number of pixels regardless of a difference in the set angle of view size.

(2)

The imaging apparatus according to (1), in which the control unit controls the angle of view size setting unit to set the set angle of view size according to a type of lens mounted on the imaging apparatus.

(3)

The imaging apparatus according to (1) or (2), in which the control unit controls the angle of view size setting unit to set the set angle of view size according to whether a crop function of the imaging apparatus is executed or canceled.

(4)

The imaging apparatus according to any one of (1) through (3), in which the first angle of view size corresponds to a size of an image sensor of a full-frame size.

(5)

The imaging apparatus according to any one of (1) through (3), in which the second angle of view size corresponds to a size of an image sensor of an APS-C size.

(6)

The imaging apparatus according to any one of (1) through (5), in which, in a case where the angle of view size setting unit changes the set angle of view size, the control unit performs the pixel count control to achieve the same or almost the same number of pixels before and after changing the set angle of view size by the angle of view size setting unit.

(7)

The imaging apparatus according to any one of (1) through (6), in which, in a case where the angle of view size setting unit changes the set angle of view size from the first angle of view size to the second angle of view size, and then changes the set angle of view size to the first angle of view size, the control unit performs the pixel count control to achieve the same or almost the same number of pixels before changing to the second angle of view size and after changing to the first angle of view size.

(8)

The imaging apparatus according to any one of (1) through (7), in which, in a case where the angle of view size setting unit changes the set angle of view size from the first angle of view size to the second angle of view size, and then changes the set angle of view size to the first angle of view size, the control unit switches, in reference to shooting-related information indicating a state regarding imaging performed before changing to the first angle of view size, between performing the pixel count control to achieve the same or almost the same number of pixels before changing to the second angle of view size and after changing to the first angle of view size and performing the pixel count control to achieve the same or almost the same number of pixels before and after changing to the first angle of view size.

(9)

The imaging apparatus according to (8), in which the shooting-related information includes operating mode information indicating an operating mode of the imaging apparatus.

(10)

The imaging apparatus according to (8), in which the shooting-related information includes object type information indicating a type of an object or shooting scene information indicating a shooting scene.

(11)

The imaging apparatus according to (8), in which the shooting-related information includes continuous shooting operation information indicating whether continuous shooting is being performed or not.

(12)

The imaging apparatus according to any one of (1) through (11), in which, in a case where the angle of view size setting unit sets the set angle of view size to the second angle of view size smaller than the first angle of view size, the control unit prevents the image size setting unit from setting the image size that is a maximum image size settable with the first angle of view size.

(13)

The imaging apparatus according to any one of (1) through (12), in which, in a case where the angle of view size setting unit sets the set angle of view size to the second angle of view size smaller than the first angle of view size, the control unit controls a display unit to display that the image size that is a maximum image size settable with the first angle of view size is unsettable.

(14)

The imaging apparatus according to any one of (1) through (13), in which, in a case where the angle of view size setting unit sets the set angle of view size to the second angle of view size smaller than the first angle of view size, the control unit controls a display unit to display a reason why the image size that is a maximum image size settable with the first angle of view size is unsettable.

(15)

The imaging apparatus according to any one of (1) through (14),
in which the imaging apparatus has a zoom function, and
the control unit cancels the zoom function in a case where the zoom function is being executed when the angle of view size setting unit changes the set angle of view size.

(16)

The imaging apparatus according to any one of (1) through (15),
in which the imaging apparatus has a continuous shooting function, and
in a case where the angle of view size setting unit changes the set angle of view size during execution of the continuous shooting function, the control unit performs the pixel count control to achieve the same or almost the same number of pixels before and after changing the set angle of view size.

(17)

The imaging apparatus according to any one of (1) through (16),
in which the imaging apparatus has zoom functions of multiple modes, and
the control unit changes the number of the zoom functions of settable modes among the zoom functions of the multiple modes for the set image size set by the image size setting unit, depending on the difference in the set angle of view size.

(18)

The imaging apparatus according to any one of (1) through (17), in which the control unit changes a zoom magnification adjustment UI of a zoom function depending on the number of the zoom functions of the settable modes.

(19)

A control method for an imaging apparatus, including:
setting a set image size selected from multiple settable image sizes;
setting a set angle of view size selected from multiple settable angle of view sizes that include a first angle of view size and a second angle of view size; and
performing pixel count control on the set image size set, to achieve a same or almost a same number of pixels regardless of a difference in the set angle of view size.

(20)

A control program for causing a computer to execute a control method for an imaging apparatus, the control method including:
setting a set image size selected from multiple settable image sizes;
setting a set angle of view size selected from multiple settable angle of view sizes that include a first angle of view size and a second angle of view size; and
performing pixel count control on the set image size set, to achieve a same or almost a same number of pixels regardless of a difference in the set angle of view size.

REFERENCE SIGNS LIST

100: Imaging apparatus
101: Control unit
104: Display unit
106: Image size setting unit
107: Angle of view size setting unit

The invention claimed is:

1. An imaging apparatus, comprising:
a central processing unit (CPU) configured to:
set an image size from multiple settable image sizes;
set an angle of view size from multiple settable angle of view sizes, wherein the multiple settable angle of view sizes include a first angle of view size and a second angle of view size;
perform pixel count control on the set image size, to achieve a same or almost a same number of pixels regardless of a difference between the first angle of view size and the second angle of view size; and
switch between
perform the pixel count control to achieve the same or almost the same number of pixels before a change to the second angle of view size and after a change to the first angle of view size, and
perform the pixel count control to achieve the same or almost the same number of pixels before and after the change to the first angle of view size, based on the set angle of view size changes from the first angle of view size to the second angle of view size, and then the set angle of view size changes to the first angle of view size, and
shooting-related information indicating a state regarding an imaging operation performed before the change to the first angle of view size.

2. The imaging apparatus according to claim 1, wherein the CPU is further configured to set the set angle of view size based on a type of lens mounted on the imaging apparatus.

3. The imaging apparatus according to claim 1, wherein the CPU is further configured to set the angle of view size based on one of an execution or a cancellation of a crop function of the imaging apparatus.

4. The imaging apparatus according to claim 1, wherein the first angle of view size corresponds to a size of an image sensor of a full-frame size.

5. The imaging apparatus according to claim 1, wherein the second angle of view size corresponds to a size of an image sensor of an APS-C size.

6. The imaging apparatus according to claim 1, wherein the shooting-related information includes operating mode information indicating an operating mode of the imaging apparatus.

7. The imaging apparatus according to claim 1, wherein the shooting-related information includes object type information indicating a type of an object or shooting scene information indicating a shooting scene.

8. The imaging apparatus according to claim 1, wherein the shooting-related information includes continuous shooting operation information indicating whether continuous shooting is being performed.

9. The imaging apparatus according to claim 1, wherein, based on the set angle of view size is the second angle of view size smaller than the first angle of view size, the CPU is further configured to prevent a setting operation to set the image size that is a maximum image size settable with the first angle of view size.

10. The imaging apparatus according to claim 1, wherein, based on the set angle of view size is the second angle of view size smaller than the first angle of view size, the CPU is further configured to cause to display that the image size that is a maximum image size, settable with the first angle of view size, is not settable.

11. The imaging apparatus according to claim 1, wherein, based on the set angle of view size is the second angle of view size smaller than the first angle of view size, the CPU is further configured to cause to display a reason why the image size that is a maximum image size, settable with the first angle of view size, is not settable.

12. The imaging apparatus according to claim 1, wherein the imaging apparatus has a zoom function, and
the CPU is further configured to cancel the zoom function based on the zoom function is executed when the CPU changes the angle of view size.

13. The imaging apparatus according to claim 1, wherein the imaging apparatus has a continuous shooting function, and
the CPU is further configured to perform, based on the set angle of view size changes during execution of the continuous shooting function, the pixel count control to achieve the same or almost the same number of pixels before and after the change of the set angle of view size.

14. The imaging apparatus according to claim 1, wherein the imaging apparatus has zoom functions of multiple modes, and
the CPU is further configured to change a number of zoom functions of settable modes, among the zoom functions of the multiple modes, of the imaging apparatus for the set image size, based on the difference between the first angle of view size and the second angle of view size.

15. The imaging apparatus according to claim 1, wherein the CPU is further configured to change a zoom magnification adjustment user interface (UI) of a zoom function based on a number of zoom functions of settable modes of the imaging apparatus.

16. A control method for an imaging apparatus, comprising:
setting an image size from multiple settable image sizes;
setting an angle of view size from multiple settable angle of view sizes, wherein the multiple settable angle of view sizes include a first angle of view size and a second angle of view size;
performing pixel count control on the set image size, to achieve a same or almost a same number of pixels regardless of a difference between the first angle of view size and the second angle of view size; and
switching between
performing the pixel count control to achieve the same or almost the same number of pixels before a change to the second angle of view size and after a change to the first angle of view size, and
performing the pixel count control to achieve the same or almost the same number of pixels before and after the change to the first angle of view size, based on set angle of view size changes from the first angle of view size to the second angle of view size, and then the set angle of view size changes to the first angle of view size, and
shooting-related information indicating a state regarding an imaging operation performed before the change to the first angle of view size.

17. A non-transitory computer-readable medium having stored thereon, computer-executable instructions which, when executed by a computer, cause the computer to execute operations, the operations comprising:
setting an image size from multiple settable image sizes;
setting an angle of view size from multiple settable angle of view sizes, wherein the multiple settable angle of view sizes include a first angle of view size and a second angle of view size;
performing pixel count control on the set image size, to achieve a same or almost a same number of pixels regardless of a difference between the first angle of view size and the second angle of view size; and
switching between
performing the pixel count control to achieve the same or almost the same number of pixels before a change to the second angle of view size and after a change to the first angle of view size, and
performing the pixel count control to achieve the same or almost the same number of pixels before and after the change to the first angle of view size, based on the set angle of view size changes from the first angle of view size to the second angle of view size, and then the set angle of view size changes to the first angle of view size, and
shooting-related information indicating a state regarding an imaging operation performed before the change to the first angle of view size.

* * * * *